(12) United States Patent
Kim et al.

(10) Patent No.: US 12,504,788 B2
(45) Date of Patent: Dec. 23, 2025

(54) ELECTRONIC DEVICES INCLUDING POLYMER LAYER HAVING PATTERN FORMED THEREON

(71) Applicant: SAMSUNG ELECTRONICS CO., LTD., Suwon-si (KR)

(72) Inventors: Seonghoon Kim, Suwon-si (KR); Youngju Lee, Suwon-si (KR); Heuisoo Jeon, Suwon-si (KR); Kyungtae Kim, Suwon-si (KR); Kwangtai Kim, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 18/308,310

(22) Filed: Apr. 27, 2023

(65) Prior Publication Data

US 2023/0266799 A1 Aug. 24, 2023

Related U.S. Application Data

(63) Continuation of application No. PCT/KR2021/013554, filed on Oct. 5, 2021.

(30) Foreign Application Priority Data

Nov. 13, 2020 (KR) .......................... 10-2020-0152251

(51) Int. Cl.
*G06F 1/16* (2006.01)
*C08J 5/12* (2006.01)
*C08J 7/04* (2020.01)

(52) U.S. Cl.
CPC ............ *G06F 1/1652* (2013.01); *C08J 5/124* (2013.01); *C08J 7/04* (2013.01); *G06F 1/1624* (2013.01)

(58) Field of Classification Search
CPC .... G06F 1/1652; G06F 1/1624; G06F 1/1637; C08J 5/124; C08J 7/04; H04M 1/0216; H04M 1/0268; G09F 9/301
See application file for complete search history.

(56) References Cited

U.S. PATENT DOCUMENTS 9,189,027 B2 * 11/2015 Lee ........................ G06F 1/1652
9,377,887 B2 6/2016 Kang
(Continued)

FOREIGN PATENT DOCUMENTS

CN 108986659 A * 12/2018 ............. B32B 33/00
KR 20150078562 A 7/2015
(Continued)

OTHER PUBLICATIONS

Extended European Search Report dated Mar. 3, 2024 for EP Application No. 21892138.5.
(Continued)

*Primary Examiner* — Rockshana D Chowdhury
(74) *Attorney, Agent, or Firm* — Nixon & Vanderhye P.C.

(57) ABSTRACT

An electronic device may include a flexible display including a first window, and a polymer layer disposed on the first window to overlap at least a partial area of the first window and having a pattern formed on at least a partial area of the surface oriented in a direction away from the surface facing the first window, wherein each of the first window, the flexible display, and the polymer layer comprises a deformation part corresponding to a deformation axis and a planar part which is disposed on at least one side with reference to the deformation part, and the pattern may comprise a recess pattern formed in the lengthwise direction of the deformation axis in the deformation part of the polymer layer. In addition, various embodiments are possible.

14 Claims, 20 Drawing Sheets

(56) References Cited

U.S. PATENT DOCUMENTS

| | | |
|---|---|---|
| 10,020,462 B1* | 7/2018 | Ai .................... H10K 59/871 |
| 10,276,813 B2 | 4/2019 | Myung et al. |
| 10,317,578 B2* | 6/2019 | Sarma .................... G02B 1/18 |
| 10,522,060 B2 | 12/2019 | Park et al. |
| 11,081,660 B2* | 8/2021 | Lee .................... B32B 27/281 |
| 11,283,032 B2* | 3/2022 | Xia .................... H10K 77/111 |
| 11,758,752 B2* | 9/2023 | Hyun .................... H10K 59/871 |
| | | 257/88 |
| 11,897,086 B2* | 2/2024 | Park .................... B24B 7/10 |
| 12,035,609 B2* | 7/2024 | Hu .................... H10K 77/111 |
| 12,041,738 B2* | 7/2024 | Nguyen ............ H04M 1/0268 |
| 12,114,451 B2* | 10/2024 | Nguyen .................... H05K 5/03 |
| 12,142,632 B2* | 11/2024 | Nguyen ............ H10H 20/819 |
| 12,174,665 B2* | 12/2024 | Youn .................... G06F 1/1626 |
| 2018/0217639 A1 | 8/2018 | Jones et al. |
| 2018/0375064 A1* | 12/2018 | Jeon .................... H10K 77/111 |
| 2020/0139672 A1* | 5/2020 | Cao .................... B32B 27/06 |
| 2020/0292731 A1* | 9/2020 | Park .................... G06F 1/1641 |
| 2020/0348727 A1 | 11/2020 | Lee |
| 2020/0392038 A1* | 12/2020 | Park .................... H04M 1/0268 |
| 2021/0072797 A1* | 3/2021 | He .................... G06F 1/189 |
| 2021/0191467 A1* | 6/2021 | Sunwoo .................... B32B 27/38 |
| 2024/0206265 A1* | 6/2024 | Lee .................... H10K 59/88 |
| 2024/0224776 A1* | 7/2024 | Chang ................ H10K 59/8792 |

FOREIGN PATENT DOCUMENTS

| | | | |
|---|---|---|---|
| KR | 10-2019-0058006 A | 5/2019 | |
| KR | 20190052954 A * | 5/2019 | ............ G09F 9/301 |
| KR | 20190091711 A | 8/2019 | |
| KR | 102068685 B1 | 1/2020 | |
| KR | 20200059370 A | 5/2020 | |
| KR | 20200082363 A | 7/2020 | |
| KR | 20200124059 A | 11/2020 | |

OTHER PUBLICATIONS

Korean Office Action dated Feb. 13, 2025 for KR Application No. 10-2020-0152251.

* cited by examiner

ELECTRONIC DEVICES INCLUDING POLYMER LAYER HAVING PATTERN FORMED THEREON

CROSS-REFERENCE TO RELATED APPLICATIONS

This application is a continuation application of International Application No. PCT/KR2021/013554 designating the United States, filed on Oct. 5, 2021, in the Korean Intellectual Property Receiving Office and claiming priority to Korean Patent Application No. 10-2020-0152251, filed on Nov. 13, 2020, in the Korean Intellectual Property Office, the disclosures of all of which are hereby incorporated by reference herein in their entireties.

BACKGROUND

Field

Various embodiments relate to electronic devices including polymer layers with patterns formed thereon.

Description of Related Art

Recently, portable electronic devices have rapidly spread due to the development of the electronic communication industry. Such portable electronic devices may include, for example, various electronic devices which can be freely used while moving without being limited to a place, such as personal digital assistants (PDA), a smartphone, a tablet PC, an MP3 player, a laptop personal computer (PC), a digital camera, and a wearable device, in addition to a mobile communication terminal for communication.

A form of the electronic device is changing into various forms depending on users' needs. For example, the electronic device may have a structure deformable in a way to be easily carried and to use a display having a large screen when used. For example, an electronic device having a foldable form in which some areas (e.g., a display area) can be folded or unfolded, if necessary, may be provided.

SUMMARY

An electronic device may include a protective window disposed on an upper end of a display to protect a window included in the display from the outside. A hybrid structure of a variable thickness may be required due to a limitation on an increase in a thickness of a film or glass constituting the protective window to secure the performance (e.g., folding, sliding, and rolling) of the electronic device according to an implementation type (e.g., a foldable display, a slidable display, and a rollable display) of the display of the electronic device.

The variable thickness may be implemented by a method such as computer numerical control (CNC) processing or laser processing, however, a visibility of a variable thickness section in the protective window may decrease. In addition, in implementation of a pen in the electronic device, surface scratches may occur, or the feeling of pressing and the feeling of writing may also be reduced due to a decrease in surface durability. If protrusions are formed on a surface, the feeling of being pressed and writing may be enhanced. However, a camera resolution may be reduced in an under display camera (UDC) area.

To solve the above-described problems, various example embodiments may provide a polymer layer on which a pattern is formed through an ultraviolet (UV) molding scheme.

According to various example embodiments, an electronic device may include a flexible display including a first window; and a polymer based layer, comprising a polymer, disposed on, directly or indirectly, the first window to overlap at least a partial area of the first window and having a pattern formed on at least a partial area of a surface facing a direction opposite to a surface facing the first window. Each of the first window, the flexible display, and the polymer based layer may include a deformation portion corresponding to a deformation axis, and a planar portion disposed on, directly or indirectly, at least one side based on the deformation portion, and the pattern may include a recess pattern formed in a lengthwise direction of the deformation axis in a deformation portion of the polymer based layer.

According to various example embodiments, an electronic device includes a first structure; a second structure disposed to be movable from the first structure; a flexible display including a window; a polymer based layer disposed on the first window to overlap at least a partial area of the window and having a pattern formed on at least a partial area of a surface facing a direction opposite to a surface facing the first window; and a housing decoration configured to cover at least a portion of the window and including a receiving groove formed by recessing a surface facing the window inward, wherein each of the window, the flexible display, and the polymer based layer includes a planar portion, a deformation portion that is partially received inside the second structure according to a sliding movement of the first structure, and a side portion that extends in a direction perpendicular to a sliding direction from the planar portion and the deformation portion, and wherein the pattern includes a recess pattern that is formed in the sliding direction in the deformation portion of the polymer layer, and a protrusion pattern that protrudes from a surface facing a direction opposite to a surface facing the window to be inserted into the receiving groove in the side portion of the polymer based layer.

Effects

Various example embodiments may implement and provide a polymer layer which is disposed on an upper end of a display and in which a pattern is formed through an ultraviolet (UV) molding scheme, and thus it is easy to realize a variable thickness and is possible to ensure a mass productivity.

BRIEF DESCRIPTION OF DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
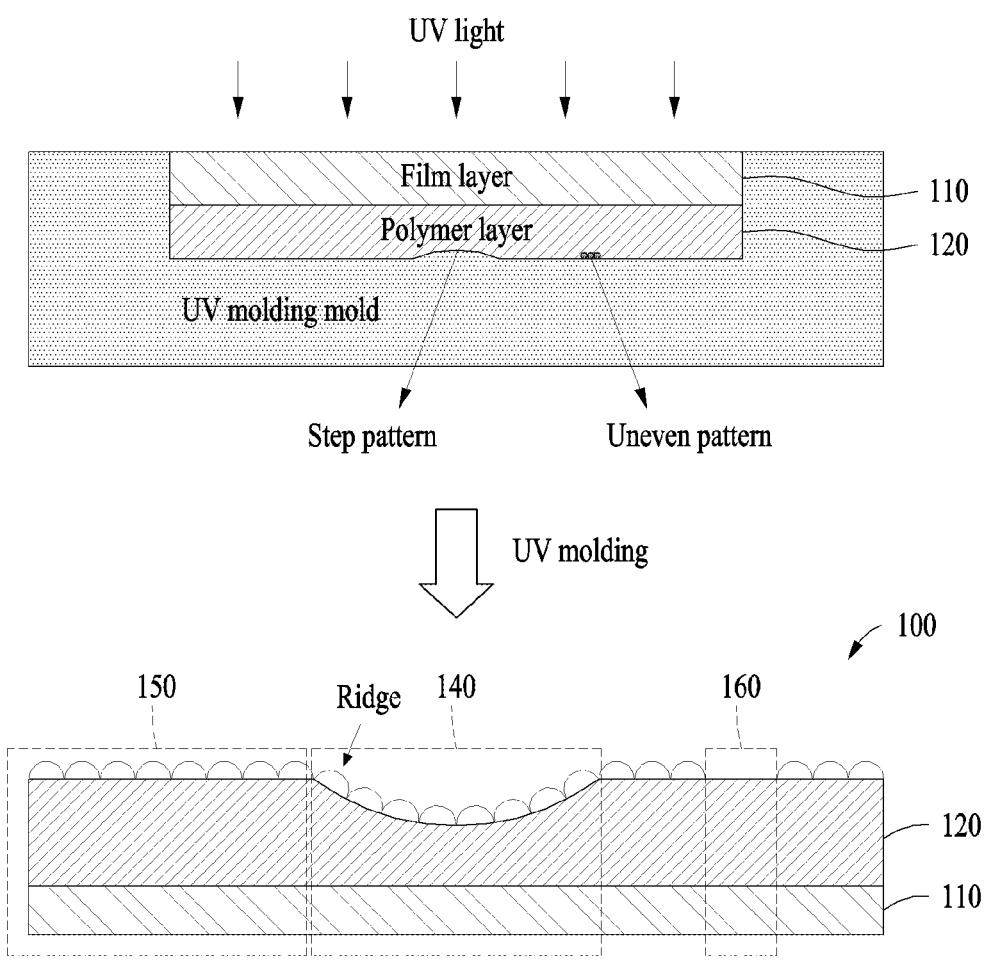
FIG. 1 is a diagram illustrating a method of implementing a window and a stack structure of a window according to various example embodiments.

Hereinafter, embodiments will be described in detail with reference to the accompanying drawings. When describing the embodiments with reference to the accompanying drawings, like reference numerals refer to like components and a repeated description related thereto will be omitted.

Figure 2:
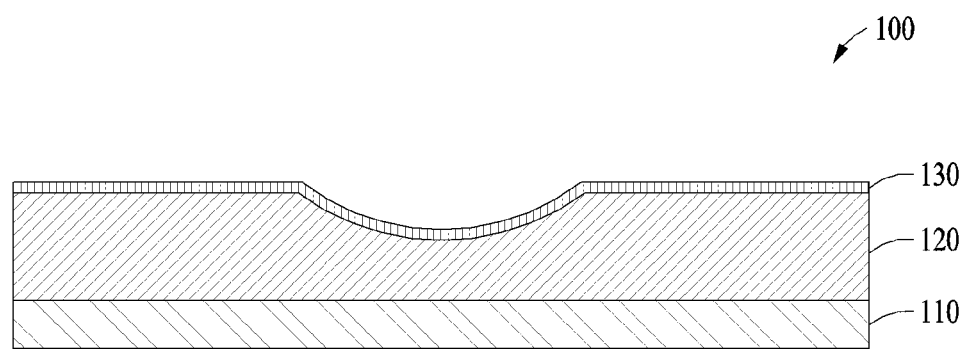
FIG. 2 is a diagram illustrating another example of a stack structure of a window according to various example embodiments.

FIG. 1 is a diagram illustrating a method of implementing a window and a stack structure of a window according to various embodiments. FIG. 2 is a diagram illustrating another example of a stack structure of a window according to various embodiments.

Referring to FIG. 1, according to various embodiments, a window 100 may refer to a protective window disposed on an upper end of a flexible display (e.g., a display 200 of FIGS. 3A to 3C, a display 330 of FIG. 7, a display 503 of FIG. 12, or a display 730 of FIG. 15) to protect a window (e.g., a first window 210 of FIGS. 3A to 3C, a first window 3301 of FIG. 7, a first window 5031 of FIG. 12, or a first window 7301 of FIG. 15) included in the display against an external impact. The window 100 may be implemented through ultraviolet (UV) molding to have a variable thickness structure.

According to various embodiments, the window 100 may be formed with a stack structure of a film layer 110 and a polymer layer 120. The film layer 100 may be a transparent film layer formed of a polymer material, and may include, for example, at least one of polyethylene terephthalate (PET), polyimide (PI), or thermoplastic polyurethane (TPU). The polymer layer 130 may include a resin.

According to various embodiments, the window 100 may be implemented by adding the polymer layer 120 in a liquid state into a UV molding mold, placing the film layer 110 on the polymer layer 120, and performing hardening using at least one of UV light and heat. Since the UV molding mold includes at least one pattern, a thickness of the polymer layer 120 may be freely adjusted using the UV molding mold, a surface treatment may be performed only on a desired area on a surface of the polymer layer 120, and at least a portion of the surface of the polymer layer 120 may be processed to be inserted into a groove. For example, at least one recess pattern (or step pattern) may be included in a portion of the UV molding mold that contacts the surface of the polymer layer 120 so that the polymer layer 120 may have a variable thickness through the UV molding mold. At least one uneven pattern may be included in a portion of the UV molding mold that contacts a required area on the surface of the polymer layer 120 such that at least one ridge may be formed on the required area. The uneven pattern may be implemented to have a slight gap between ridges. Mirror-like finishing may be performed on a corresponding contact surface of the polymer layer 120 in a portion of the UV molding mold that does not include the uneven pattern. The ridges may also be formed with anti-glare (AG) coating, and the like. In addition, at least one protrusion pattern may be included in a UV molding mold portion so that a protrusion (e.g., a protrusion 675 of FIG. 13B and a protrusion 875 of FIG. 16C) that is insertable into a groove may be formed in at least a portion of the surface of the polymer layer 120. By freely adjusting the thickness of the polymer layer 120 constituting the window 100 using the UV molding scheme and performing the surface treatment on only the desired area on the surface of the polymer layer 120, the window 100 may have a variable thickness and at least one ridge may be included only in the desired area.

According to various embodiments, a pattern may be formed on at least a partial area of the polymer layer 120. The pattern may include at least one of a recess pattern, an uneven pattern, and a protrusion pattern.

According to various embodiments, the window 100 may include a stepped portion 140, a planar portion 150, and a sensor portion 160. The stepped portion 140 may be a deformable area of the window 100 and may include a recess pattern, and the planar portion 150 may be an area extending from the stepped portion 140 in the window 100. The sensor portion 160, which is an area at least partially included in the planar portion 150, may be an area corresponding to a sensor area (e.g., a sensor area 330*d* of FIG. 4) in which a sensor is disposed in a display, in the window 100. The sensor area may be an area in which at least one sensor is disposed, and may include, for example, a camera hole area, a sensor hole area, an under display camera (UDC) area, and/or an under display sensor (UDS) area. A sensor may include at least one of a front camera, a proximity sensor, an illuminance sensor, an iris recognition sensor, a fingerprint sensor, an ultrasonic sensor, or an indicator.

According to various embodiments, a step may be formed in the stepped portion 140 due to a recess pattern formed in the polymer layer 120 and may be based on a thickness difference between a portion of the polymer layer 120 corresponding to the stepped portion 140 and a portion of the polymer layer 120 corresponding to the planar portion 150 (e.g., the film layer 110 may have a thickness of 25 to 50 um, the polymer layer 120 of the stepped portion 140 may have a thickness of 8 um, the polymer layer 120 of the planar portion 150 may have a thickness of 45 to 60 um). The recess pattern may coincide with a boundary of the stepped portion 140 and may be formed to include a portion of the planar portion 150 beyond the boundary of the stepped portion 140. A recess may have an elliptical concave shape and may include various shapes such as a trapezoidal shape and a quadrangular shape. For example, the step may have a height of about 30 um or greater (e.g., the stepped portion 140 may have a thickness of 32 to 58 um, and the planar portion 150 may have a thickness of 90 to 110 um). As described above, since the variable thickness is implemented using the UV molding mold, a visibility of a boundary of a section (e.g., the stepped portion 140) in which the thickness is variable while implementing the variable thickness of the stepped portion 140 and the planar portion 150 may be overcome.

According to various embodiments, the stepped portion 140 may be formed in at least one area of the window 100. For example, in addition to the stepped portion 140 shown in FIG. 1, the window 100 may further include a stepped portion 140 (e.g., a side portion 470 of FIG. 8B, a side portion 670 of FIG. 13B, and a side portion 870 of FIG. 16C) in an edge area. The stepped portion 140 of the edge area may include a protrusion pattern (e.g., a side portion 675 of FIG. 13B and the side portion 875 of FIG. 16C).

According to various embodiments, a position of the step portion 140 in the window 100 may vary depending on an implementation type of the display on which the window 100 is disposed. For example, when the display is a foldable display, the stepped portion 140 may be positioned in an area of the window 100 corresponding to a folding area (e.g., a folding area 330*c* of FIG. 7) of the display. When the display is a slidable display, the stepped portion 140 may be positioned in an area of the window 100 corresponding to a sliding area (e.g., a second area A2 of FIG. 12) of the display. When the display is a rollable display, the stepped portion 140 may be positioned in an area of the window 100 corresponding to a rolling area (e.g., regions R2 to R6 of FIG. 15) of the display. For example, according to the implementation type of the display, the stepped portion 140 may also be referred to as a "folding portion" (e.g., a folding portion 440 of FIG. 7), a "sliding portion" (e.g., a sliding portion 640 of FIG. 12), or a "rolling portion" (e.g., a rolling portion 840 of FIG. 15).

According to various embodiments, the stepped portion 140 and the planar portion 150 may include at least one uneven pattern. When the stepped portion 140 and the planar portion 150 include a plurality of ridges, a gap between the ridges may be absent or a slight gap may be present. The sensor portion 160 may not include an uneven pattern. For example, the sensor portion 160 may be mirror-finished. By forming at least one uneven pattern on areas of the window 100 other than the sensor portion 160, for example, the stepped portion 140 and the planar portion 150, a feeling in use of a pen may be enhanced. The sensor portion 160 corresponding to the camera hole area, the sensor hole area, the UDC area, and the UDS area may be mirror-finished, so that haze-induced resolution reduction (or reduction in a camera resolution) due to ridges may be prevented or reduced. It is possible to implement ridges using the UV molding mold, thereby preventing or reducing a stepping phenomenon caused by bending, and the like in the stepped portion 140.

Referring to FIG. 2, according to various embodiments, the window 100 may also be formed with a stack structure of the film layer 110, the polymer layer 120, and a coating layer 130. The coating layer 130 may include a plurality of layers and may be a layer for surface pressing, scratches, slip, or anti-fingerprint properties. When the film layer 110 and the polymer layer 120 are implemented in the window 100 using the UV molding scheme described above, the coating layer 130 may be formed by coating the surface of the polymer layer 120. For example, the coating layer 130 may include at least one of an anti-fouling layer or an anti-fingerprint layer (AF layer), a hard coating layer (HC layer), an anti-reflection layer (AR layer) or a low reflection layer (LR layer), and an anti-glare layer (AG layer).

According to various embodiments, the polymer layer 120 may enable folding, sliding, or rolling in the stepped portion 140 through the variable thickness and may enhance a durability in the planar portion 150. The polymer layer 120 may have a modulus less than those of the film layer 110 and the coating layer 130. For example, the modulus of the coating layer 130 may be within a range of 7 to 10 GPa, and the modulus of the film layer 110 may be within a range of 3 to 7 GPa. To maintain performance of folding, sliding, or rolling in the stepped portion 140 and ensure the durability in the planar portion 150, the modulus of the polymer layer 120 may be within a range of 1 to 2.5 GPa.

Figure 3A:
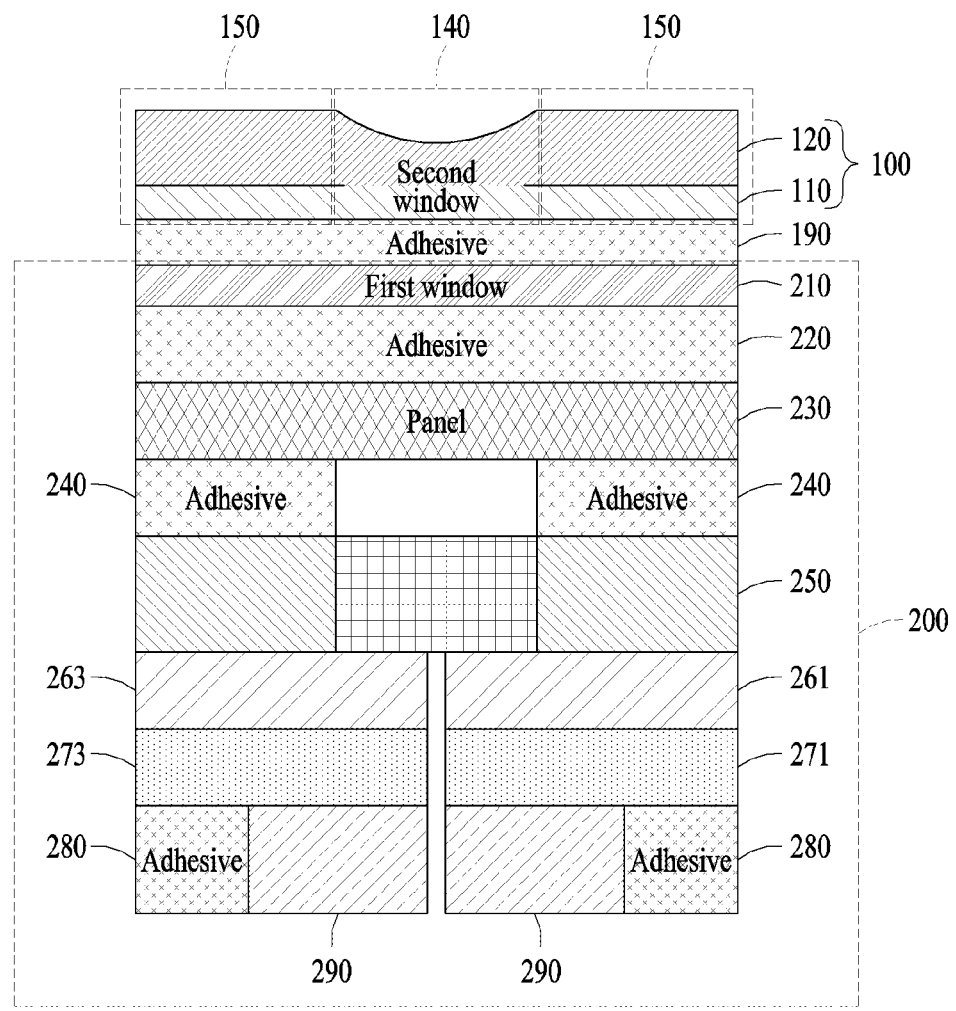
FIG. 3A illustrates an example of a display structure in which a window is disposed according to various example embodiments.

FIG. 3A illustrates an example of a display structure in which a window is disposed according to various embodiments.

Referring to FIG. 3A, according to various embodiments, the window 100 may be disposed on a flexible display (hereinafter, briefly referred to as a "display") 200, and the display 200 may include a window 210. The window 210 may be implemented with glass including ultra-thin glass (UTG) or a polymer material (e.g., polyimide (PI)). For example, the window 210, which is a basic window included in the display 200, may be referred to as the first window 210, and the window 100, which is a protective window disposed on a top end of the display 200 to protect the first window 210 against an external impact, may be referred to as the second window 100. Although the second window 100 may be implemented separately from the display 200, the display 200 may include the second window 100 together with the first window 210.

According to various embodiments, the first window 210 may be implemented with a first material, and the second window 100 may be implemented with a second material. The first material may include PET or PI having relatively excellent optical properties in comparison to the second material. The second material may include TPU that is relatively excellent in elasticity in comparison to the first material.

According to various embodiments, a thickness of the stepped portion 140 of the second window 100 may be greater than that of the first window 210 (e.g., the stepped portion 140 may have a thickness of 32 to 58 um, and the first window 210 may have a thickness of 30 um).

According to various embodiments, the second window 100 may be disposed on a top portion of the display 200 to cover at least a partial area of the display 200, for example, at least a partial area of the first window 210. A pattern may be formed in at least a partial area of a surface of the polymer layer 120 facing a direction opposite to a surface facing the first window 210. A surface of at least one of the film layer 110 and the polymer layer 120 facing the first window 210 may be flat across the stepped portion 140 and a planar portion 150. A surface of the first window 210 facing the polymer layer 120 may be flat throughout.

According to various embodiments, a bottom surface of the second window 100 facing the display 200 may be attached to at least a partial area of the first window 210 by an adhesive 190. The adhesive 190 may include at least one of an optical clear adhesive (OCA), a pressure sensitive adhesive (PSA), a heat reactive adhesive, a general adhesive, or a double-sided tape. The adhesive 190 may have an adhesive strength less than that of an adhesive 220, or a thickness of a portion to which the adhesive 190 is applied may be less than a thickness of a portion to which the adhesive 220 is applied. The second window 100 may be separable from the first window 210 attached to be replaced with another second window 100 separately from the first window 210, without a damage to the display 200.

According to various embodiments, the polymer layer 120 may be attached to the first window 210 directly without the film layer 110. The adhesive 190 may have an adhesive strength less than that of an adhesive 220, or a thickness of a portion to which the adhesive 190 is applied may be less than a thickness of a portion to which the adhesive 220 is applied.

According to various embodiments, the display 200 may include a display panel 230 (e.g., the display panel 230 with a thickness of 35 um) disposed on a rear surface of the first window 210 (e.g., the first window 210 with a thickness of 30 um). In the display panel 230, a color filter and a black matrix (BM) may be implemented instead of a polarizer (POL) (e.g., a polarizing film). The display 200 may further include a conductive plate 250 (e.g., the conductive plate 250 with a thickness of 50 um), a pair of digitizers 261 and 263 (e.g., the digitizers 261 and 263 with a thickness of 131.5 um), and a pair of reinforcement plates 271 and 273 (e.g., the reinforcement plates 271 and 273 with a thickness of 80 um). In addition, the display 200 may further include a barrier polyimide (PI) (not shown) (e.g., the barrier PI with a thickness of 50 um) disposed between the display panel 230 and an adhesive 240. The first window 210 and the display panel 230 may be attached to each other by the adhesive 220 (e.g., the adhesive 220 with a thickness of 50 um), and the display panel 230 and the conductive plate 250 may be attached to each other by the adhesive 240 (e.g., the adhesive 240 with a thickness of 8 um). The display 200 may be attached to a structure, in which the display 200 is seated, by an adhesive 280 (e.g., the adhesive 280 with a thickness of 200 um). For example, the adhesive 220, 240, 280 may include at least one of an optical clear adhesive (OCA), a pressure sensitive adhesive (PSA), a heat reactive adhesive, a general adhesive, or a double-sided tape. The conductive plate 250, the digitizers 261 and 263, and the reinforcement plates 271 and 273 may also be attached to each other by an adhesive (not shown).

According to various embodiments, the conductive plate 250 may be at least partially bendable and foldable through a plurality of openings spaced apart from each other. The conductive plate 250 may include at least one of Cu, Al, SUS, or CLAD (e.g., a laminated member in which SUS and Al are alternately disposed). A width of an opening area of the conductive plate 250 in which the plurality of openings is formed may be different from a width of the stepped portion 140 of the second window 100.

According to various embodiments, the display 200 may further include an insulation member 290 (e.g., the insulation member 290 with a thickness of 200 um) attached to at least a portion of the first reinforcement plate 271 and at least a portion of the second reinforcement plate 273. Through the insulating member 290, an electric shock accident may be prevented or reduced from occurring when the first reinforcement plate 271 and the second reinforcement plate 273 formed of a conductive material directly contact a structure formed of a conductive material. The insulating member 290 may include at least one of an insulation film, an insulating spray, an insulating cushion, or an insulating tape.

According to various embodiments, the display 200 may further include a cushion layer (not shown) disposed on the conductive plate 250. The cushion layer may be formed of a material (e.g., sponge or poron) for cushioning.

According to various embodiments, to prevent or reduce steps formed by openings, patterns, and the like formed in the conductive plate 250, the digitizers 261 and 263, and the like from being visually recognized from the outside, the barrier PI may be processed to be opaque. Alternatively, to prevent or reduce steps formed by openings, patterns, and the like formed on the conductive plate 250, the digitizers 261 and 263, and the like from being visually recognized from the outside, a separate opaque layer (not shown) may be disposed between a lower end of the display panel 230 and the conductive plate 250 or between the lower end of the display panel 230 and the digitizers 261 and 263, or coating with an opaque material may be formed. Alternatively, to prevent or reduce steps formed by openings, patterns, and the like formed on the conductive plate 250, the digitizers 261 and 263, and the like from being visually recognized from the outside, at least one of adhesive layers (e.g., the adhesive 240) disposed between the lower end of the display panel 230 and the conductive plate 250 or between the lower end of the display panel 230 and the digitizers 261 and 263 may be processed to be opaque.

According to various embodiments, the conductive plate 250, the pair of digitizers 261 and 263, and the pair of reinforcement plates 271 and 273 may not be disposed. The barrier PI may also not be disposed. Only one digitizer in the pair of digitizers 261 and 263 may also be disposed.

Figure 3B:
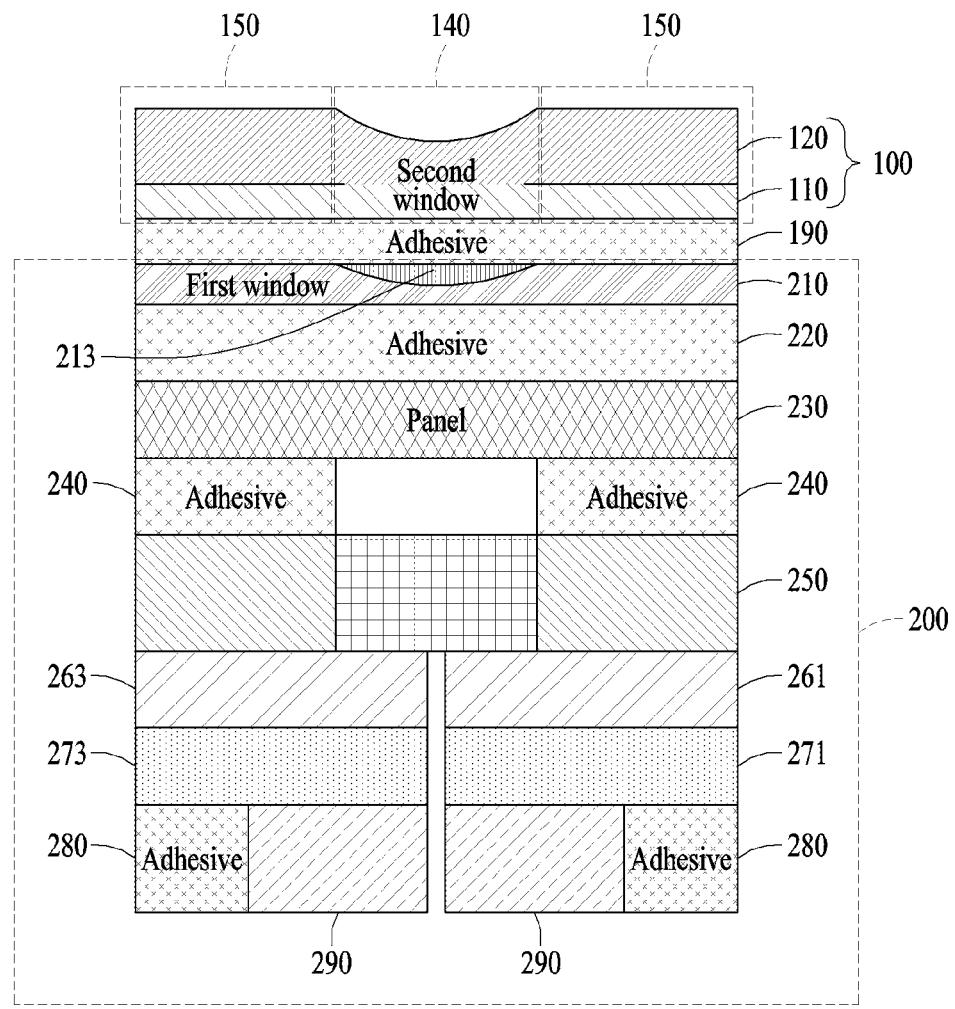
FIG. 3B illustrates another example of a display structure in which a window is disposed according to various example embodiments.

FIG. 3B illustrates another example of a display structure in which a window is disposed according to various embodiments.

Referring to FIG. 3B, according to various embodiments, a recess may be formed in the first window 210 to correspond to a recess pattern formed in the polymer layer 120, and the formed recess may be filled with a transparent polymer 213. The first window 210 may also improve a visibility due to planarization and refraction in a folding area (e.g., the folding area 330c of FIG. 7), a sliding area (e.g., the second area A2 of FIG. 12), or a rolling area (e.g., the regions R2 to R6 of FIG. 15). According to various embodiments, the recess of the first window 210 may be formed in at least one of a surface facing the second window 100 and a surface opposite to the surface facing the second window 100. The recess formed in the window 210 may have an elliptical concave shape and may include various shapes such as a trapezoidal shape and a quadrangular shape. The polymer 213 may include a resin.

According to various embodiments (not shown), the transparent polymer 213 may be applied by a predetermined thickness onto the entire surface of the first window 210 on which the recess is formed while filling the formed recess.

Figure 3C:
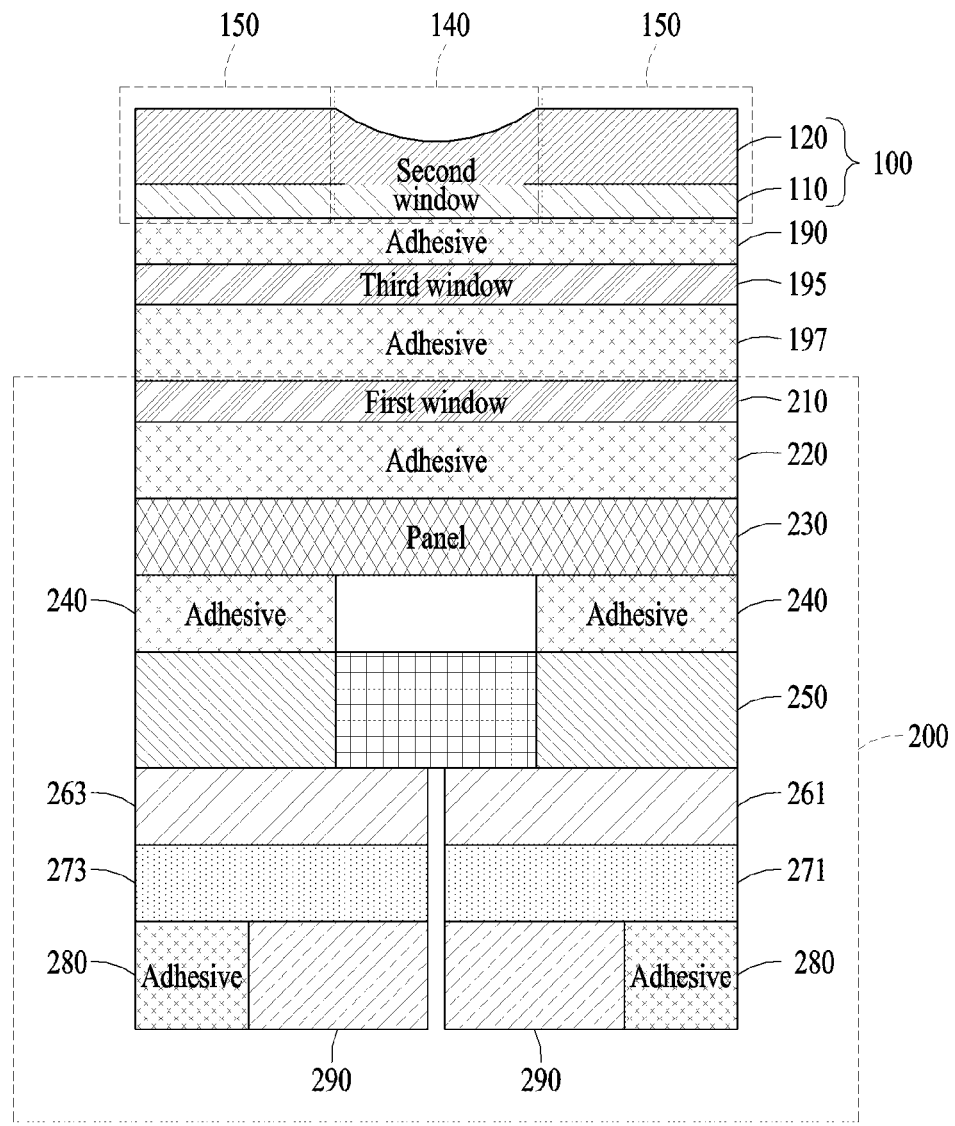
FIG. 3C illustrates another example of a display structure in which a window is disposed according to various example embodiments.

FIG. 3C illustrates another example of a display structure in which a window is disposed according to various embodiments.

Referring to FIG. 3C, according to various embodiments, a third window 195 may be disposed between the first window 210 and the second window 100. The third window 195 may also refer to a protective window disposed on the display 200 to protect the display 200 against an external impact. Although the second window 100 and/or the third window 195 may be implemented separately from the display 200, the display 200 may include the second window 100 and/or the third window 195 together with the first window 210.

According to various embodiments, a surface of the third window 195 facing the display 200 may be attached to at least a partial area of the first window 210 by an adhesive 197, and a surface opposite to the surface of the third window 195 facing the display 200 may be attached to at least a partial area of the bottom surface of the second window 210 by the adhesive 190. The adhesive 190 may have an adhesive strength less than that of the adhesive 197, and a thickness of a portion to which the adhesive 190 is applied may be less than a thickness of a portion to which the adhesive 197 is applied. In a state in which the first window 210 and the third window 195 are attached, the second window 100 may be separable from the third window 195 instead of damaging the first window 210 and the third window 195. The second window 100 may be replaced with another second window 100.

According to various embodiments, a thickness of the third window 195 may be greater than that of the first window 210 (e.g., the first window 210 with a thickness of um, and the third window 195 with a thickness of 50 um). The thickness of the stepped portion 140 of the second window 100 may be greater than that of the first window 210, and the thickness of the planar portion 150 of the second window 100 may be greater than that of the third window 195 (e.g., the stepped portion 140 may have a thickness of 32 to 58 um, and the planar portion 150 may have a thickness of 90 to 110 um).

According to various embodiments, the display 200 on which the second window 100 is disposed may be applied to a foldable electronic device that operates in an in-folding manner and/or an out-folding manner in a range of 0 degrees to 360 degrees, a multi-foldable electronic device that operates in a multi-folding manner in which a plurality of housings (e.g., three or more housings) is configured to alternately fold opposite to each other, a slidable-type electronic device configured to facilitate selective expansion of a display area by allowing a second housing to at least partially slide from a first housing, and a rollable-type electronic device with a display rolled like a scroll. The display 200 on which the second window 100 is disposed may be applied to various deformable electronic devices in which a shape and/or a display area of the display is correspondingly changed through an operative change of at least one housing.

Figure 4:
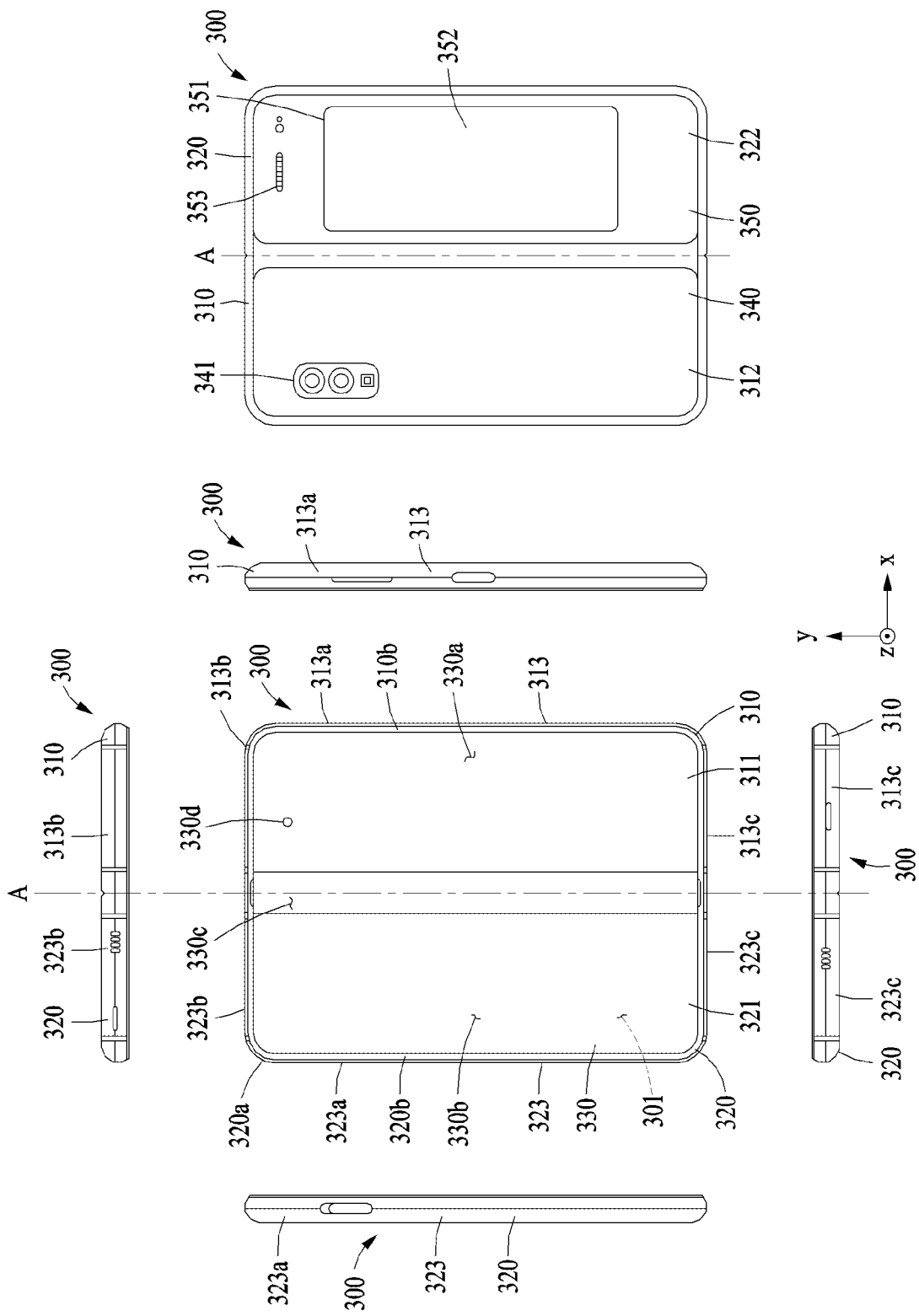
FIG. 4 is a diagram illustrating an unfolded state of an electronic device according to various example embodiments.
Figure 5:
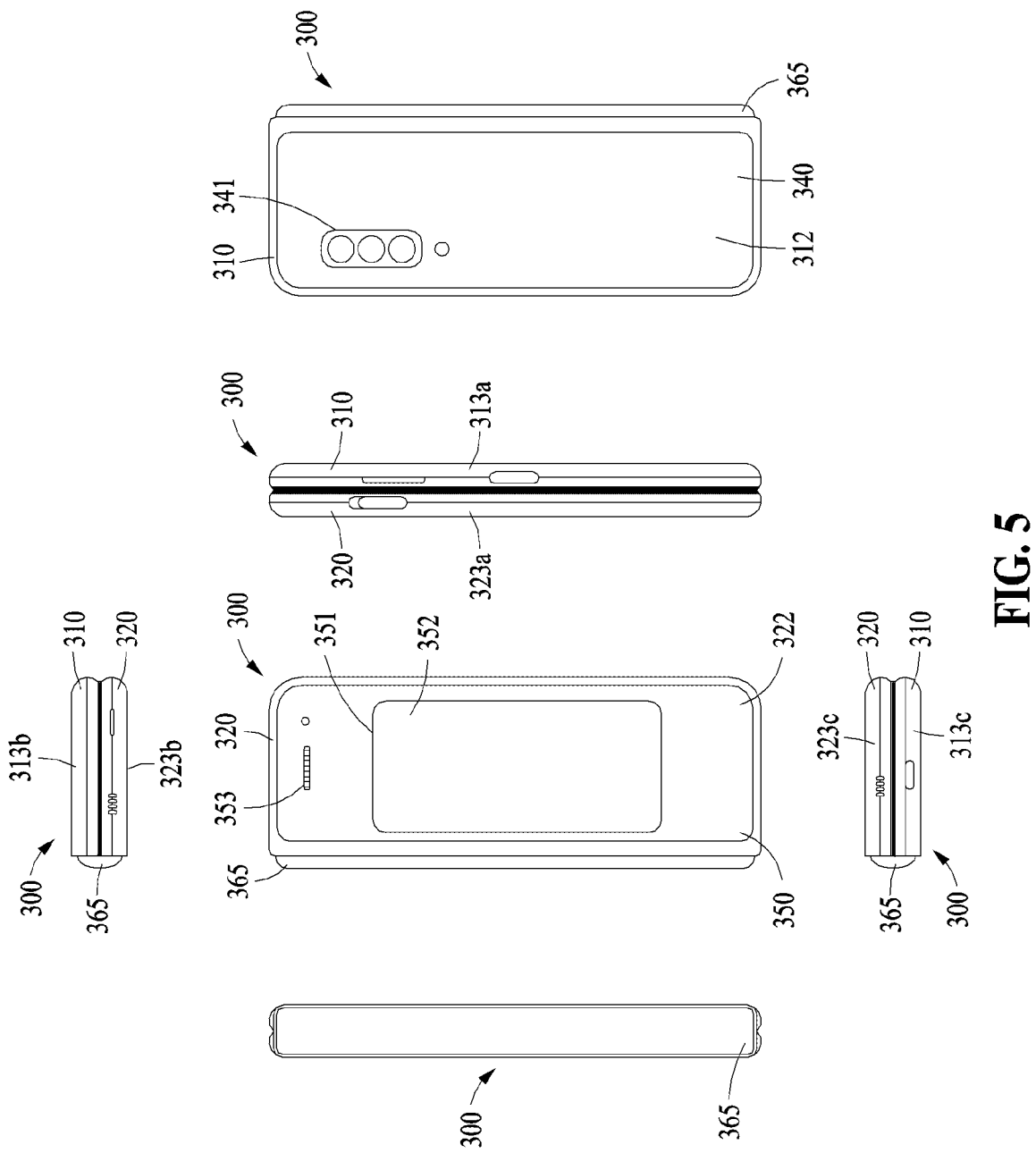
FIG. 5 is a diagram illustrating a folded state of the electronic device of FIG. 4 according to various example embodiments.

FIG. 4 is a diagram illustrating an unfolded state of an electronic device according to various embodiments. FIG. 5 is a diagram illustrating a folded state of the electronic device of FIG. 4 according to various embodiments.

Referring to FIG. 4, according to various embodiments, an electronic device 300 may be a foldable electronic device. The electronic device 300 may include a pair of housing structures 310 and 320 (e.g., a foldable housing structure) that are rotatably coupled via a hinge structure (e.g., a hinge structure 364 of FIG. 6) to be folded with respect to each other, a hinge cover (e.g., a hinge cover 365 of FIG. 5) that covers foldable portions of the pair of housing structures 310 and 320, and a display 330 (e.g., a flexible display, a foldable display, or a first display) that is disposed in a space formed by the pair of housing structures 310 and 320. For example, a surface on which the display 330 is disposed may be a front surface of the electronic device 300, and a surface opposite to the front surface may be a rear surface of the electronic device 300. In addition, a surface surrounding a space between the front surface and the rear surface may be a side surface of the electronic device 300.

In an embodiment, the pair of housing structures 310 and 320 may include a first housing structure 310, a second housing structure 320, a first rear cover 340, and a second rear cover 350. The pair of housing structures 310 and 320 of the electronic device 300 is not limited to the shapes and combinations shown in FIGS. 4 and 5, and may be implemented by a combination and/or coupling of other shapes or components. For example, in another embodiment, the first housing structure 310 and the first rear cover 340 may be integrally formed, and the second housing structure 320 and the second rear cover 350 may be integrally formed.

According to an embodiment, the first housing structure 310 and the second housing structure 320 may be disposed on both sides of a folding axis A and generally may be symmetrical with respect to the folding axis A. According to an embodiment, an angle or distance between the first housing structure 310 and the second housing structure 320 may vary depending on whether the electronic device 300 is in a flat stage or unfolded state, a folded state, or an intermediate state. According to an embodiment, unlike the second housing structure 320, the first housing structure 310 may additionally include the sensor area 330d in which at least one sensor is arranged, however, the first housing structure 310 and the second housing structure 320 may have shapes symmetrical to each other in areas other than the sensor area 330d. In another embodiment, the sensor area 330d may be additionally disposed in or replaced with at least a partial area of the second housing structure 320. The sensor area 330d may include, for example, a camera hole area, a sensor hole area, an under display camera (UDC) area, and an under display sensor (UDS) area.

In an embodiment, in the unfolded state of the electronic device 300, the first housing structure 310 may be connected, directly or indirectly, to a hinge structure (e.g., the hinge structure 364 of FIG. 6) and may include a first surface 311 facing the front surface of the electronic device 300, a second surface 312 facing a direction opposite to the first surface 311, and a first side member 313 enclosing at least a portion of a space between the first surface 311 and the second surface 312. In an embodiment, the first side member 313 may include a first side surface 313a disposed in parallel to the folding axis A, a second side surface 313b extending in a direction perpendicular to the folding axis A from one end of the first side surface 313a, and a third side surface 313c extending in the direction perpendicular to the folding axis A from another end of the first side surface 313a.

In an embodiment, in the unfolded state of the electronic device 300, the second housing structure 320 may be connected, directly or indirectly, to a hinge structure (e.g., the hinge structure 364 of FIG. 6) and may include a third surface 321 facing the front surface of the electronic device 300, a fourth surface 322 facing a direction opposite to the third surface 321, and a second side member 323 enclosing at least a portion of a space between the third surface 321 and the fourth surface 322. In an embodiment, the second side member 323 may include a fourth side member 323a disposed in parallel to the folding axis A, a fifth side surface 323b extending in the direction perpendicular to the folding axis A from one end of the fourth side surface 323a, and a sixth side surface 323c extending in the direction perpendicular to the folding axis A from another end of the fourth side surface 323a. In an embodiment, the third surface 321 may face the first surface 311 in the folded state.

In an embodiment, the electronic device 300 may include a recess 301 formed to accommodate the display 330 through structural shape coupling of the first housing structure 310 and the second housing structure 320. The recess 301 may have substantially the same size as the display 330.

In an embodiment, at least a portion of the first housing structure 310 and the second housing structure 320 may be formed of a metal material or a non-metal material having a magnitude of rigidity selected to support the display 330.

In an embodiment, the first rear cover 340 may be disposed on the second surface 312 of the first housing structure 310, and may have a substantially rectangular periphery. In an embodiment, the periphery may be at least partially wrapped by the first housing structure 310. Similarly, the second rear cover 350 may be disposed on the fourth surface 322 of the second housing structure 320, and a periphery of the second rear cover 350 may be at least partially wrapped by the second housing structure 320.

In the illustrated embodiment, the first rear cover 340 and the second rear cover 350 may have substantially symmetrical shapes with respect to the folding axis A. In another embodiment, the first rear cover 340 and the second rear cover 350 may also include different shapes. In another embodiment, the first rear cover 340 may be formed integrally with the first housing structure 310, and the second rear cover 350 may be formed integrally with the second housing structure 320.

In an embodiment, the first rear cover 340, the second rear cover 350, the first housing structure 310, and the second housing structure 320 may provide a space in which various components (e.g., a PCB, an antenna module, a sensor module, or a battery) of the electronic device 300 may be arranged through a structure in which the first rear cover 340, the second rear cover 350, the first housing structure 310, and the second housing structure 320 are coupled to one another. In an embodiment, one or more components may be disposed or visually exposed on the rear surface of the electronic device 300. For example, one or more components or sensors may be visually exposed through a first rear area 341 of the first rear cover 340. In various embodiments, the sensors may include a proximity sensor, a rear camera module, and/or a flash. In another embodiment, at least a portion of a sub-display 352 (e.g., a second display) may be visually exposed through a second rear area 351 of the second rear cover 350. In another embodiment, the electronic device 300 may include a speaker module 353 disposed through at least a partial area of the second rear cover 350.

The display 330 may be disposed in a space formed by the pair of housing structures 310 and 320. For example, the display 330 may be seated in the recess 301 formed by the pair of housing structures 310 and 320 and may be disposed to substantially occupy most of the front surface of the electronic device 300. Accordingly, the front surface of the electronic device 300 may include the display 330, and a partial area (e.g., a periphery area) of the first housing structure 310 and a partial area (e.g., a periphery area) of the second housing structure 320, which are adjacent to the display 330. In an embodiment, the rear surface of the electronic device 300 may include the first rear cover 340, a partial area (e.g., a periphery area) of the first housing structure 310 adjacent to the first rear cover 340, the second rear cover 350, and a partial area (e.g., a periphery area) of the second housing structure 320 adjacent to the second rear cover 350.

In an embodiment, the display 330 may refer to a display in which at least a partial area is deformable into a flat surface or a curved surface. In an embodiment, the display 330 may include the folding area 330c, a first area 330a disposed on one side (e.g., a right side of the folding area 330c) of the folding area 330c, and a second area 330b disposed on the other side (e.g., a left side of the folding area 330c) of the folding area 330c. For example, the first area 330a may be disposed on the first surface 311 of the first housing structure 310, and the second area 330b may be disposed on the third surface 321 of the second housing structure 320. In an embodiment, the area division of the display 330 is merely an example, and the display 330 may be divided into a plurality of areas (e.g., four or more areas, or two areas) depending on the structure or functions thereof. In an example, as shown in FIG. 4, the display 330 may be divided into areas based on the folding axis A or the folding area 330c extending in parallel to a y-axis. In another example, the display 330 may be divided into areas based on another folding area (e.g., a folding area parallel to an x-axis) or another folding axis (e.g., a folding axis parallel to the x-axis). The area division of the display described above is merely a physical division based on the pair of housing structures 310 and 320 and the hinge structure (e.g., the hinge structure 364 of FIG. 6), and the display 330 may display substantially one full screen through the pair of housing structures 310 and 320 and the hinge structure (e.g., the hinge structure 364 of FIG. 7). In an embodiment, the first area 330a and the second area 330b may have generally symmetrical shapes with respect to the folding area 330c. In another embodiment (not shown), the first area 330a and the second area 330b may have shapes asymmetrical to each other. For example, at least a portion of the first area 330a may include a cut notch area, and the first area 330a and the second area 330b may have mutually symmetrical portions and mutually asymmetrical portions.

Figure 6:
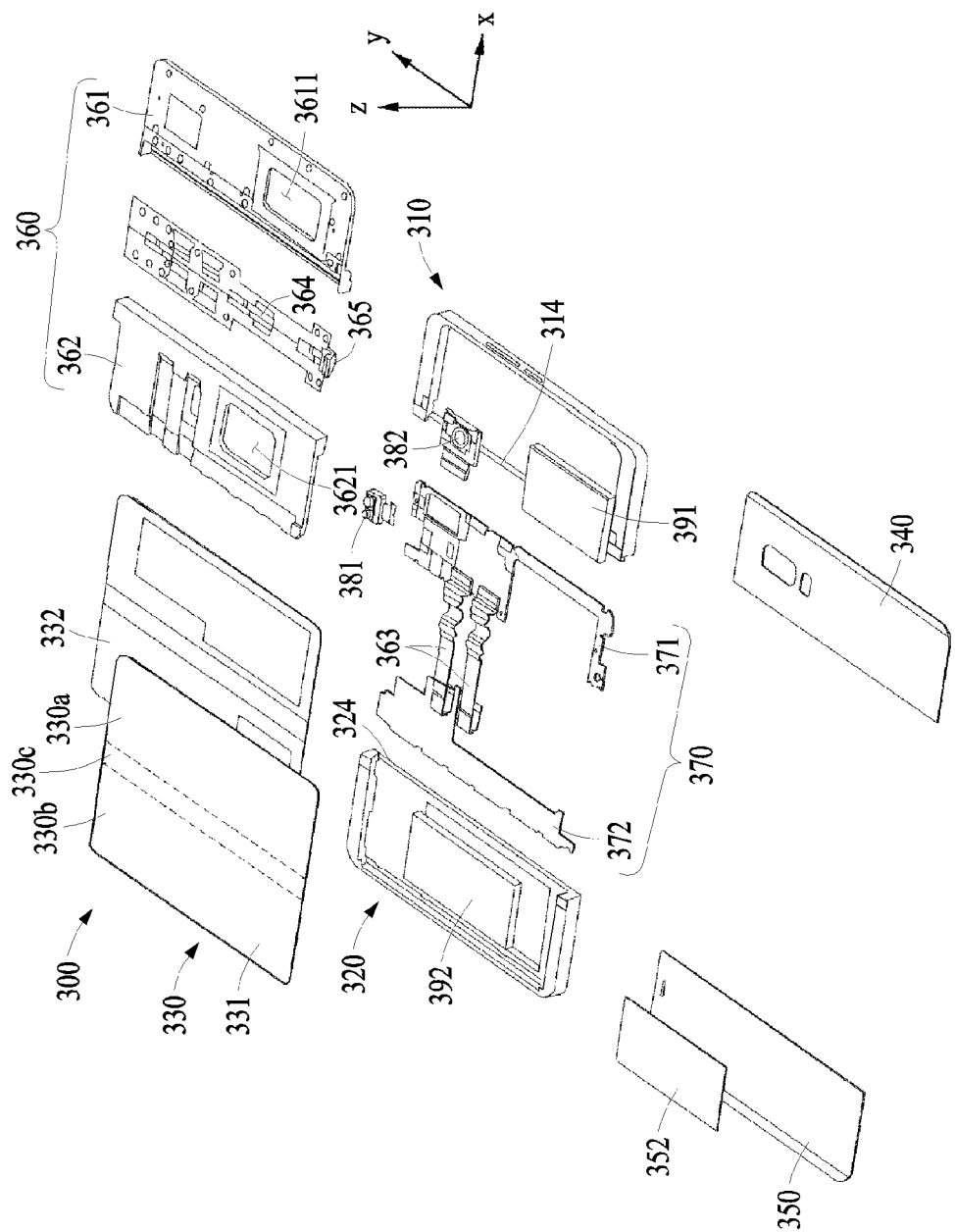
FIG. 6 is an exploded perspective view of the electronic device of FIG. 4 according to various example embodiments.

Referring to FIG. 5, the hinge cover 365 may be disposed between the first housing structure 310 and the second housing structure 320 to cover internal components (e.g., the hinge structure 364 of FIG. 6). In an embodiment, the hinge cover 365 may be covered by a portion of the first housing structure 310 and the second housing structure 320 or may be exposed to the outside, depending on an operating state (e.g., a flat state or a folded state) of the electronic device 300.

In an example, as shown in FIG. 4, if the electronic device 300 is in the unfolded state, the hinge cover 365 may not be exposed by being covered by the first housing structure 310 and the second housing structure 320. In another example, as shown in FIG. 5, if the electronic device 300 is in the folded state (e.g., a completely folded state), the hinge cover 365 may be exposed to the outside between the first housing structure 310 and the second housing structure 320. For example, when the first housing structure 310 and the second housing structure 320 are in an intermediate state in which the first housing structure 310 and the second housing structure 320 are folded with a certain angle therebetween, the hinge cover 365 may be at least partially exposed to the outside of the electronic device 300 between the first housing structure 310 and the second housing structure 320. In this example, the exposed area may be less than that in a fully folded state. In an embodiment, the hinge cover 365 may include a curved surface.

Hereinafter, operations of the first housing structure 310 and the second housing structure 320 and respective areas of the display 330 depending on the operating state (e.g., a flat state and a folded state) of the electronic device 300 will be described.

In an embodiment, when the electronic device 300 is in the flat state (e.g., the state of FIG. 4), the first housing structure 310 and the second housing structure 320 may form a first angle (e.g., about 180 degrees) therebetween, and the first area 330*a* and the second area 330*b* of the display may be oriented in substantially the same direction. In addition, the folding area 330*c* may form substantially the same plane as the first area 330*a* and the second area 330*b*. In another embodiment, when the electronic device 300 is in the flat state, the first housing structure 310 and the second housing structure 320 may be rotated by a second angle (e.g., about 360 degrees) with respect to each other and folded to oppose each other such that the second surface 312 and the fourth surface 322 may face each other. In other words, the first area 330*a* and the second area 330*b* of the display may also be disposed to face each other in opposite directions.

In an embodiment, when the electronic device 300 is in the folded state (e.g., the state of FIG. 5), the first housing structure 310 and the second housing structure 320 may be disposed to face each other. The first area 330*a* and the second area 330*b* of the display 330 may form a narrow angle (e.g., about 0 to 10 degrees) therebetween and may face each other. For example, at least a portion of the folding area 330*c* may be formed as a curved surface having a predetermined curvature.

In an embodiment, when the electronic device 300 is in the intermediate state, the first housing structure 310 and the second housing structure 320 may be disposed to form a certain angle (e.g., about 90 degrees) therebetween. The first area 330*a* and the second area 330*b* of the display 330 may form an angle greater than that in the folded state and smaller than that in the unfolded state. At least a portion of the folding area 330*c* may include a curved surface having a predetermined curvature, and the curvature may be less than that in the folded state.

FIG. 6 is an exploded perspective view of the electronic device of FIG. 4 according to various embodiments.

Referring to FIG. 6, in an embodiment, the electronic device 300 may include a display 330, a support member assembly 360, at least one PCB 370, a first housing structure 310, a second housing structure 320, a first rear cover 340, and a second rear cover 350. For example, the display 330 (e.g., the first display) may also be referred to as a display module or a display assembly.

The display 330 may include a display panel 331 (e.g., a flexible display panel), and at least one plate 332 or layer on which the display panel 331 is seated. In an embodiment, the at least one plate 332 may include a conductive plate (e.g., a copper (Cu) sheet or a stainless steel (SUS) sheet) disposed between the display panel 331 and the support member assembly 360. According to an embodiment, the conductive plate may be formed to have substantially the same area as that of the display, and an area facing a folding area of the display may be formed to be bendable. The plate 335 may include at least one subsidiary material layer (e.g., a graphite member) disposed on a rear surface of the display panel 331. In an embodiment, the plate 332 may be formed in a shape corresponding to that of the display panel 331.

The support member assembly 360 may include a first support member 361 (e.g., a first support plate), a second support member 362 (e.g., a second support plate), the hinge structure 364 disposed between the first support member 361 and the second support member 362, the hinge cover 365 that covers the hinge structure 364 when the hinge structure 364 is viewed from the outside, and at least one wiring member 363 (e.g., a flexible PCB (FPCB)) crossing the first support member 361 and the second support member 362.

In an embodiment, the support member assembly 360 may be disposed between the plate 332 and at least one PCB 370. For example, the first support member 361 may be disposed between the first area 330*a* of the display 330 and a first PCB 371. The second support member 362 may be disposed between the second area 330*b* of the display 330 and a second PCB 372.

In an embodiment, at least a portion of the wiring member 363 and the hinge structure 364 may be disposed inside the support member assembly 360. The wiring member 363 may be disposed in a direction (e.g., an x-axis direction) crossing the first support member 361 and the second support member 362. The wiring member 363 may be disposed in a direction (e.g., the x-axis direction) substantially perpendicular to the folding axis (e.g., the y-axis or the folding axis A of FIG. 4) of the folding area 330*c*.

In an embodiment, the at least one PCB 370 may include, as described above, the first PCB 371 disposed on the side of the first support member 361 and the second PCB 372 disposed on the side of the second support member 362. The first PCB 371 and the second PCB 372 may be disposed in a space formed by the support member assembly 360, the first housing structure 310, the second housing structure 320, the first rear cover 340, and the second rear cover 350. Components for implementing various functions of the electronic device 300 may be mounted on the first PCB 371 and the second PCB 372.

In an embodiment, a first space of the first housing structure 310 may include the first PCB 371 disposed in a space formed through the first support member 361, a first battery 391 disposed at a position facing a first swelling hole 3611 of the first support member 361, at least one sensor module 381, or at least one camera module 382. The at least one sensor module 381 or at least one camera module 380 may be disposed at a position corresponding to the sensor area 330*d* or the first rear area 341 in the first space of the first housing structure 310. In an embodiment, a second space of the second housing structure 320 may include the second PCB 372 disposed in a second space formed through the second support member 362, and a second battery 392 disposed at a position facing a second swelling hole 3621 of the second support member 362. According to an embodiment, the first housing structure 310 and the first support member 361 may be integrally formed. According to an embodiment, the second housing structure 320 and the second support member 362 may also be integrally formed. According to an embodiment, the sub-display 352 may be disposed in the second space of the second housing structure 320. According to an embodiment, the sub-display 352 (e.g., the second display) may be disposed to be visible from the outside through at least a partial area of the second rear cover 350.

In an embodiment, the first housing structure 310 may include a first rotation support surface 314, and the second housing structure 320 may include a second rotation support surface 324 corresponding to the first rotation support surface 314. The first rotation support surface 314 and the second rotation support surface 324 may include curved surfaces corresponding to curved surfaces included in the hinge cover 365.

In an embodiment, when the electronic device 300 is in the unfolded state (e.g., the state of FIG. 4), the first rotation support surface 314 and the second rotation support surface 324 may cover the hinge cover 365 such that the hinge cover 365 may not be exposed or may be minimally exposed through the rear surface of the electronic device 300. In an embodiment, when the electronic device 300 is in the folded state (e.g., the state of FIG. 5), the first rotation support surface 314 and the second rotation support surface 324 may rotate along the curved surface included in the hinge cover 365 so that the hinge cover 365 may be maximally or highly exposed through the rear surface of the electronic device 300.

Figure 7:
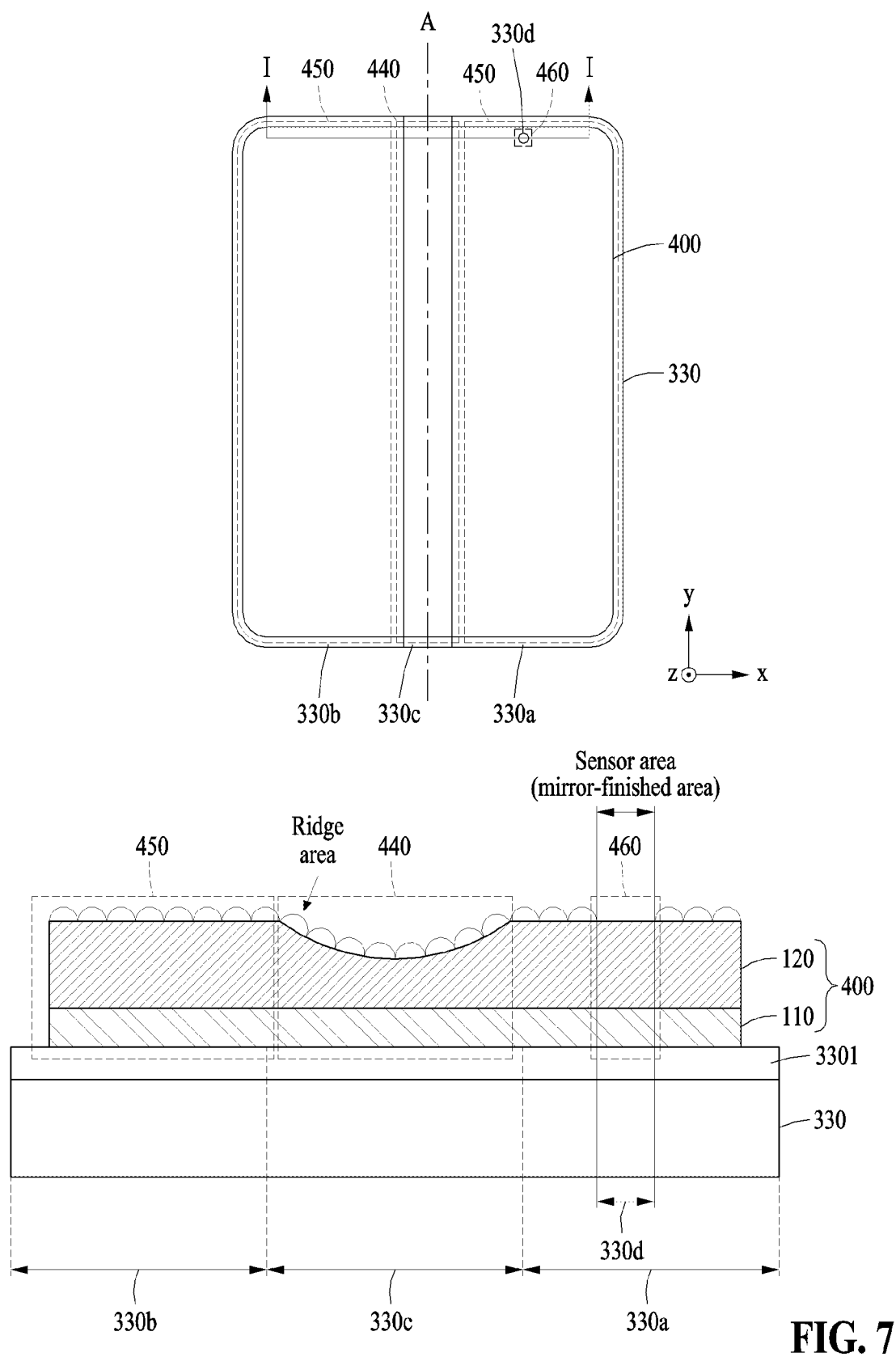
FIG. 7 illustrates a front surface of a display on which a window is disposed and a cross section of a structure of the display on which the window is disposed, according to various example embodiments.

FIG. 7 illustrates a front surface of a display on which a window is disposed and a cross section of a structure of the display on which the window is disposed, according to various embodiments. For example, FIG. 7 is a cross-sectional view taken along line I-I.

A second window 400 of FIG. 7 may be at least partially similar to the window 100 of FIGS. 1 to 3C or may further include other embodiments of the window. The display 330 of FIG. 7 may be at least partially similar to the display 200 of FIGS. 3A to 3C or may further include other embodiments of the display.

Referring to FIG. 7, according to various embodiments, the display 330 may include the first window 3301, and the second window 400 having a variable thickness may be disposed on the first window 3301. The second window 400 may cover at least a portion of the first window 3301.

According to various embodiments, the second window 400 may be formed with a stack structure of a film layer 110 and a polymer layer 120. The second window 400 may further include a coating layer (e.g., the coating layer 130 of FIG. 2) formed by coating a surface of the polymer layer 120.

According to various embodiments, the second window 400 may include a folding portion 440, a planar portion 450, and a sensor portion 460. The folding portion 440 may correspond to the folding area 330c of the display 330. The planar portion 450 may extend from the folding portion 440 and correspond to the first area 330a of the display 330 disposed on one side and a second area 330b of the display 330 disposed on the other side based on the folding area 330c. The sensor portion 460 may correspond to a sensor area 330d of the display 330 in which a sensor is disposed. The sensor area 330d may be an area in which at least one sensor is disposed, and may include, for example, a camera hole area, a sensor hole area, an under display camera (UDC) area, and an under display sensor (UDS) area. A sensor may include at least one of a front camera, a proximity sensor, an illuminance sensor, an iris recognition sensor, an ultrasonic sensor, or an indicator.

According to various embodiments, each of the first window 3301, the display 330, and the polymer layer 120 may include a deformation portion (e.g., the folding area 330c, and the folding portion 440) corresponding to a deformation axis (e.g., the folding axis A), and a planar portion (e.g., the first area 330a, the second area 330b, and the planar portion 450) disposed on at least one side based on the deformation portion. The deformation portion and the planar portion may correspond to each other. A pattern may be formed in at least a partial area of a surface of the polymer layer 120 facing a direction opposite to a surface facing the first window 3301. The pattern may include a recess pattern formed in a lengthwise direction of the folding axis A. The recess pattern may coincide with a boundary of the folding portion 440 and may be formed to include a portion of a planar portion 550 beyond the boundary of the folding portion 440.

According to various embodiments, a step may be formed in the folding portion 440 due to a recess pattern formed in the polymer layer 120 and may be based on a thickness difference between a portion of the polymer layer 120 corresponding to the folding portion 440 and a portion of the polymer layer 120 corresponding to the planar portion 450. Accordingly, the second window 400 may have a variable thickness. The step formed in the folding portion 440 may have an elliptical concave shape and may include various shapes such as a trapezoidal shape and a quadrangular shape.

According to various embodiments, the pattern of the polymer layer 120 may include at least one uneven pattern formed in the folding portion 440 and the planar portion 450, and the sensor portion 460 may not include the uneven pattern. By forming at least one uneven pattern in the rest, for example, the folding portion 440 and the planar portion 450, of the polymer layer 120 except for the sensor portion 460, a visibility may be improved and a feeling in use of a pen may be enhanced.

According to various embodiments, a surface of at least one of the film layer 110 and the polymer layer 120 facing the first window 3301 may be flat across the folding portion 440 and the planar portion 450. A surface of the first window 3301 facing the polymer layer 120 may be flat across the folding area 330c, the first area 330a, and the second area 330b.

Figure 8A:
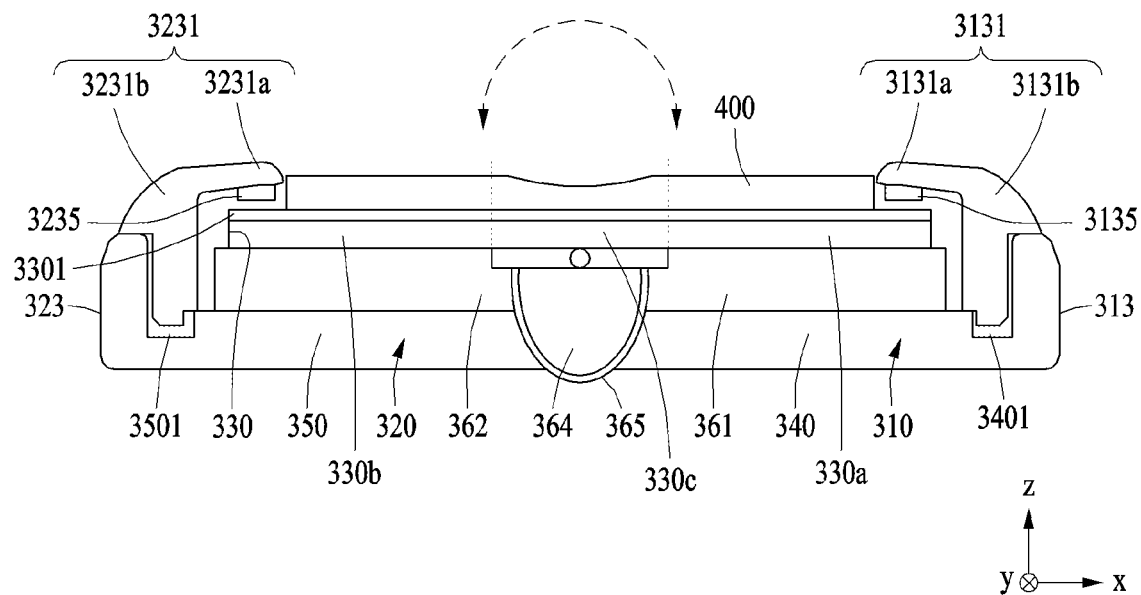
FIG. 8A illustrates an example of a cross section of an electronic device according to various example embodiments.

FIG. 8A illustrates an example of a cross section of an electronic device according to various embodiments. FIG. 8A is a cross-sectional view schematically illustrating the electronic device 300 of FIG. 4, when the electronic device 300 is cut away in an x-axis direction.

Referring to FIG. 8A, according to various embodiments, the first housing structure 310 may surround a space formed by the first side member 313 and the first rear cover 340, and the second housing structure 320 may surround a space formed by the second side member 323 and the second rear cover 350. The first support member 361 may be disposed in the space surrounded by the first housing structure 310, and the second support member 362 may be disposed in the space surrounded by the second housing structure 320.

According to various embodiments, the display 330 may include the first window 3301, and the second window 400 having a variable thickness may be disposed on the first window 3301. The display 330 may be across the first support member 361 and the second support member 362. The first area 330a of the display 330 may be supported by the first support member 361, and the second area 330b of the display 330 may be supported by the second support member 362. The folding area 330c of the display 330 may be disposed at a position corresponding to the hinge structure 364 or the hinge cover 365.

According to various embodiments, the electronic device 300 may include housing decorations 3131 and 3231 that may cover at least a partial area of the display 330, and sealing members 3135 and 3235. The first housing decoration 3131 may cover at least a partial area of the display 330 from a top end of the first side member 313, and the first sealing member 3135 may be attached to a portion of the first housing decoration 3131 that covers at least a portion of an edge area of the display 330. The second housing decoration 3231 may cover at least a partial area of the display 330 from an upper end of the second side member 323, and the second sealing member 3235 may be attached to a portion of the second housing decoration 3231 which covers at least a portion of an edge area of the display 330.

According to various embodiments, the first housing decoration 3131 may include a first decoration head 3131a, and a first decoration body 3131b. The first decoration body 3131b may be coupled to a first coupling groove 3401 that is recessed from an inner wall of the first rear cover 340 and formed at a corner in which the first rear cover 340 and the first side member 313 meet. The first decoration head 3131a may extend from the first decoration body 3131b to cover at least a partial area of the display 330. The first sealing member 3135 may be attached to the first decoration head 3131a to prevent or reduce foreign substances from flowing into a space between the first housing decoration 3131 and the display 330.

According to various embodiments, the second housing decoration 3231 may include a second decoration head 3231a, and a second decoration body 3231b. The second decoration body 3231b may be coupled to a second coupling groove 3501 that is recessed from an inner wall of the second rear cover 350 and formed at a corner in which the second rear cover 350 and the second side member 323 meet. The second decoration head 3231a may extend from the second decoration body 3231b to cover at least a partial area of the display 330. The second sealing member 3235 may be attached to the second decoration head 3231a to prevent or reduce foreign substances from flowing into a space between the second housing decoration 3231 and the display 330.

According to various embodiments, the electronic device 300 may include the second window 400 that is disposed on the display 330 to cover at least a partial area of the display 330. The second window 400 may be disposed not to be covered by the housing decorations 3131 and 3231. The second window 400 may be replaced with another second window 400.

Figure 8B:
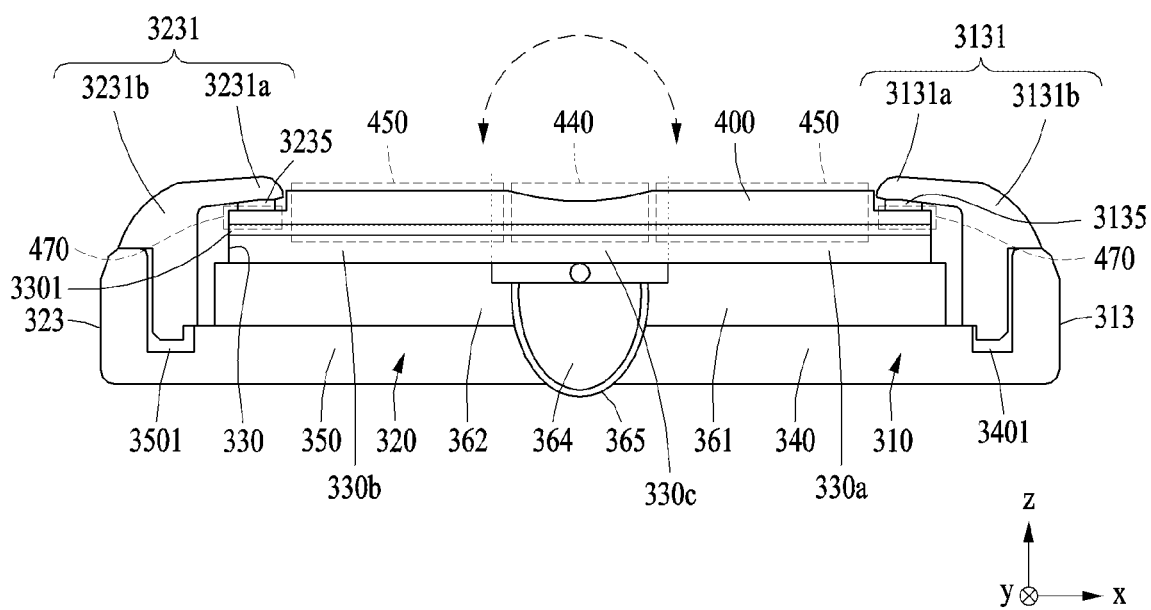
FIG. 8B illustrates another example of a cross section of an electronic device according to various example embodiments.

FIG. 8B illustrates another example of a cross section of an electronic device according to various embodiments.

Referring to FIG. 8B, according to various embodiments, the display 330 may include the first window 3301, and the second window 400 having a variable thickness may be disposed on the first window 3301. Unlike the second window 400 illustrated in FIG. 8A, the second window 400 may be disposed so that the second window 400 may be shielded from the outside by the housing decorations 3131 and 3231.

According to various embodiments, the second window 400 may include the folding portion 440, the planar portion 450, and the side portion 470. The side portion 470 may be an edge area of the second window 400 that extends in the x-axis direction from the planar portion 450. At least a portion of the side portion 470 may be covered by the housing decorations 3131 and 3231. As shown in FIG. 8B, at least a partial area of the second window 400, for example, the side portion 470, may be shielded from the outside by the pair of housing decorations 3131 and 3231, and the second window 400 may not be replaceable.

According to various embodiments, the side portion 470 may include a step. A height of the step formed in the side portion 470 may be greater than a height of the step formed in the folding portion 440. A portion of the polymer layer 120 corresponding to the side portion 470 may be covered by the housing decorations 3131 and 3231. If a height of the polymer layer 120 is reduced by forming a relatively large number of steps compared to the polling portion 440, the total thickness may be reduced, and a step between the second window 400 and the housing decorations 3131 and 3231 may be reduced.

Figure 9:
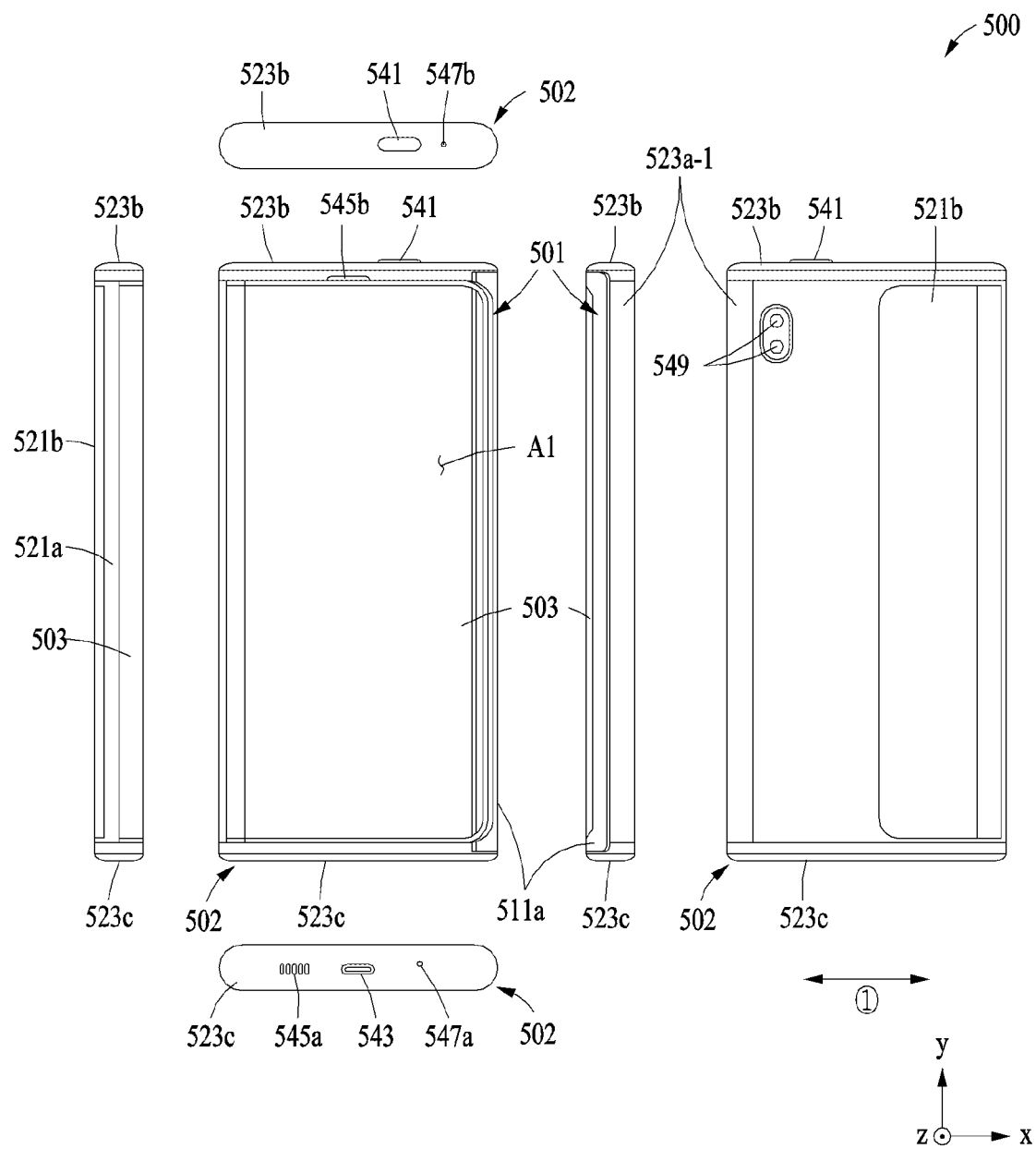
FIGS. 9 and 10 are diagrams illustrating examples of an electronic device according to various embodiments.
Figure 10:
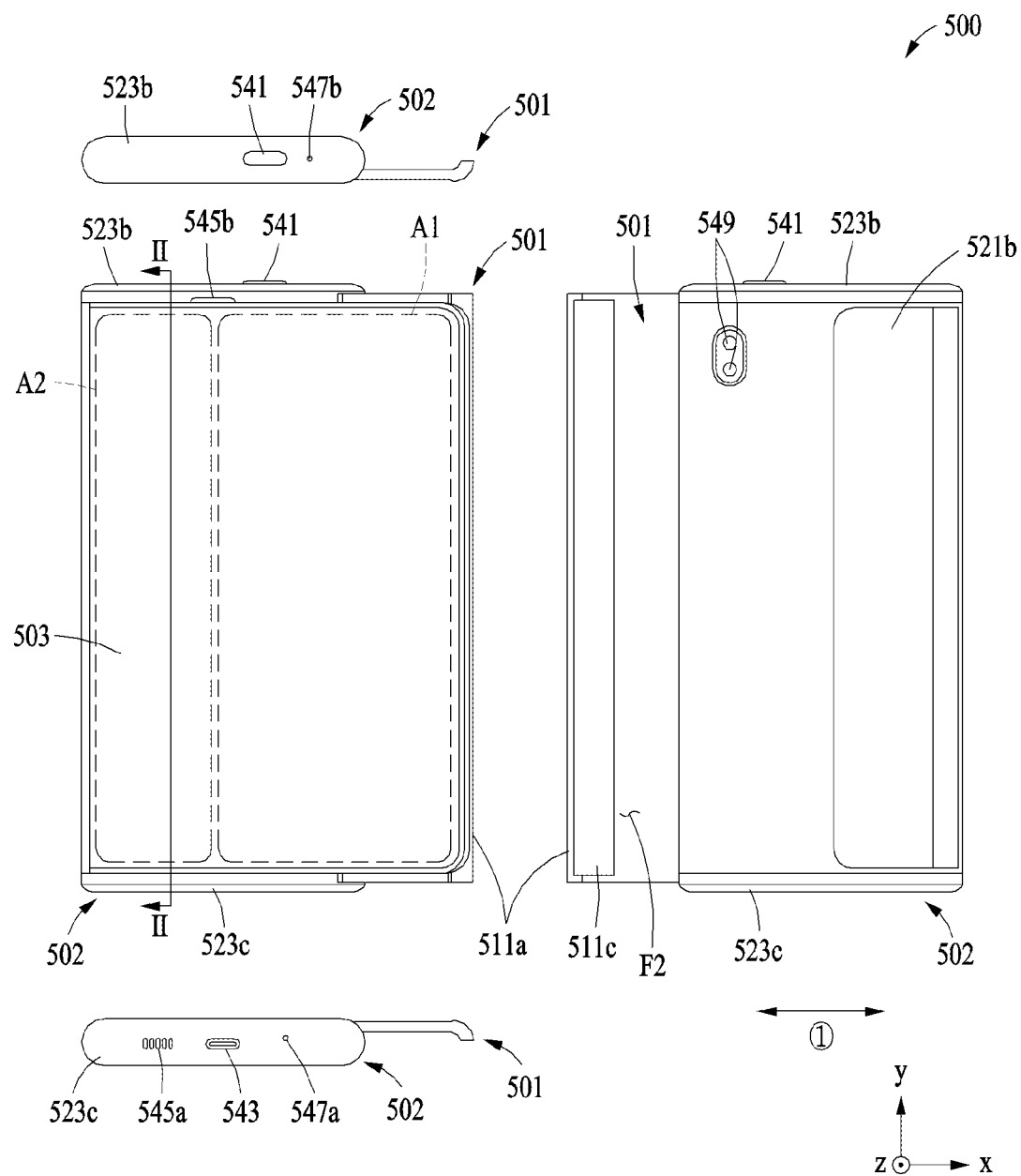

FIG. 9 is a diagram illustrating an electronic device according to various embodiments, showing a state in which a portion (e.g., a second area A2) of a display 503 is received in a second structure 502. FIG. 10 is a diagram illustrating an electronic device 500 according to various embodiments disclosed herein, showing a state in which most of the display 503 is exposed to the outside of the second structure 502.

The state shown in FIG. 9 may be a state in which a first structure 501 is closed with respect to the second structure 502. The state shown in FIG. 9 may be a state in which the first structure 501 is opened with respect to the second structure 502. Depending on embodiments, a "closed state" or an "opened state" may be a state in which an electronic device is closed or opened.

Referring to FIGS. 9 and 10, according to various embodiments, the electronic device 500 may be a slidable type electronic device. The electronic device 500 may include the first structure 501, and the second structure 502 that is disposed to be movable in the first structure 501. In some embodiments, in the electronic device 500, the first structure 501 may be interpreted as a structure disposed to slidably move on the second structure 502. According to an embodiment, the first structure 501 may be disposed to be reciprocatable by a predetermined distance with respect to the second structure 502 in a direction shown, for example, in a direction indicated by an arrow ①).

According to various embodiments, the first structure 501 may be referred to as, for example, a first housing, a slide part, or a slide housing, and may be disposed to be reciprocatable on the second structure 502. In an embodiment, the second structure 502 may be referred to as, for example, a second housing, a main part, or a main housing, and may accommodate various electric and electronic components such as a circuit board or a battery. A portion (e.g., a first area A1) of the display 503 may be seated in the first structure 501. In some embodiments, according to a movement (e.g., a sliding movement) of the first structure 501 with respect to the second structure 502, another portion (e.g., the second area A2) of the display 503 may be received (e.g., a slide-in operation) inside the second structure 502 or exposed (e.g., a slide-out operation) to the outside of the second structure 502.

According to various embodiments, the first structure 501 may include a first plate 511a (e.g., a slide plate), and may include a first surface F1 (see FIG. 11) formed by including at least a portion of the first plate 511a and a second surface F2 facing a direction opposite to the first surface F1. According to an embodiment, the second structure 502 may include a second plate 521a (see FIG. 11) (e.g., a rear case), a first side wall 523a extending from the second plate 521a, a second side wall 523*b* extending from the first side wall 523*a* and the second plate 521*a*, a third side wall 523*c* extending from the first side wall 523*a* and the second plate 521*a* and parallel to the second side wall 523*b*, and/or a rear plate 521*b* (e.g., a rear window). In some embodiments, the second side wall 523*b* and the third side wall 523*c* may be formed substantially perpendicular to the first side wall 523*a*. According to an embodiment, the second plate 521*a*, the first side wall 523*a*, the second side wall 523*b*, and the third side wall 523*c* may be formed to be open at one side (e.g., a front face) to receive (or surround) at least a portion of the first structure 501. For example, the first structure 501 in a state of being at least partially surrounded may be coupled to the second structure 502 and may slide in a direction parallel to the first surface F1 or the second surface F2, for example, in the direction indicated by arrow ①, while being guided by the second structure 502.

According to various embodiments, the second side wall 523*b* or the third side wall 523*c* may be omitted. According to an embodiment, the second plate 521*a*, the first side wall 523*a*, the second side wall 523*b*, and/or the third side wall 523*c* may be formed as separate structures and coupled or combined together. The rear plate 521*b* may be coupled to surround at least a portion of the second plate 521*a*. In some embodiments, the rear plate 521*b* may be formed substantially integrally with the second plate 521*a*. According to an embodiment, the second plate 521*a* or the rear plate 521*b* may cover at least a portion of the display 503. For example, the display 503 may be at least partially received inside the second structure 502, and the second plate 521*a* or the rear plate 521*b* may cover a portion of the display 503 received inside the second structure 502.

According to various embodiments, the first structure 501 may move to the opened state or the closed state with respect to the second structure 502 in a first direction (for example, a direction ①) parallel to the second plate 521*a* (e.g., the rear case) and the second side wall 523*b*. The first structure 501 may move to be positioned at a first distance from the first side wall 523*a* in the closed state and positioned at a second distance greater than the first distance from the first side wall 523*a* in the opened state. In some embodiments, in the closed state, the first structure 501 may be positioned to surround a portion of the first side wall 523*a*.

According to various embodiments, the electronic device 500 may include the display 503, a key input device 541, a connector hole 543, audio modules 545*a*, 545*b*, 547*a*, and 547*b*, or a camera module 549. Although not shown, the electronic device 500 may further include an indicator (e.g., a light-emitting diode (LED) device) or various sensor modules.

According to various embodiments, the display 503 may include the first area A1 and the second area A2. In an embodiment, the first area A1 may substantially extend across at least a portion of the first surface F1 to be disposed on the first surface F1. The second area A2 may extend from the first area A1 and may be inserted or received inside the second structure 502 (e.g., a housing) or may be exposed to the outside of the second structure 502 according to the sliding movement of the first structure 501. As will be described below, the second area A2 may move while being substantially guided by a roller 151 (see FIG. 11) mounted to the second structure 502 to be received inside the second structure 502 or exposed to the outside of the second structure 502. For example, while the first structure 501 slides, a portion of the second area A2 may be deformed into a curved shape at a position corresponding to the roller 551.

According to various embodiments, when viewed from above the first plate 511*a* (e.g., a slide plate), if the first structure 501 moves from the closed state to the opened state, the second area A2 may substantially form a flat surface together with the first area A1 while being gradually exposed out of the second structure 502. The display 503 may be coupled to or arranged adjacent to a touch sensing circuit, a pressure sensor for measuring an intensity (pressure) of a touch, and/or a digitizer for detecting a magnetic field-type stylus pen. In an embodiment, the second area A2 may be at least partially received inside the second structure 502, and even in a state shown in FIG. 9 (e.g., the closed state), a portion of the second area A2 may be exposed to the outside. In some embodiments, regardless of the closed state or the opened state, the exposed portion of the second area A2 may be positioned on the roller 551 and the portion of the second area A2 may maintain a curved shape at the position corresponding to the roller 551.

The key input device 541 may be disposed on the second side wall 523*b* or the third side wall 523*c* of the second structure 502. According to the appearance and the state of use, the electronic device 500 may be designed to omit the illustrated key input device 541 or to include additional key input device(s). In some embodiments, the electronic device 500 may include a key input device not shown, for example, a home key button or a touch pad disposed around the home key button. According to another embodiment, at least a portion of the key input device 541 may be disposed in one area of the first structure 501.

According to various embodiments, the connector hole 543 may be omitted depending on embodiments, and may accommodate a connector (e.g., a USB connector) for transmitting and receiving power and/or data to and from an external electronic device. Although not shown, the electronic device 500 may include a plurality of connector holes 543, and some of the plurality of connector holes 543 may function as connector holes for transmitting and receiving an audio signal to and from an external electronic device. In the illustrated embodiment, although the connector hole 543 is disposed on the third side wall 523*c*, the present disclosure is not limited thereto. For example, the connector hole 543 or a connector hole not shown may be disposed on the first side wall 523*a* or the second side wall 523*b*.

According to various embodiments, the audio modules 545*a*, 545*b*, 547*a*, and 547*b* may include speaker holes 545*a* and 545*b*, or microphone holes 547*a* and 547*b*. One of the speaker holes 545*a* and 545*b* may be provided as a receiver hole for calling and the other one may be provided as an external speaker hole. A microphone for obtaining an external sound may be disposed in the microphone hole 547*a*, 547*b*. In some embodiments, a plurality of microphones may be disposed to detect a direction of a sound. In some embodiments, the speaker hole 545*a*, 545*b* and the microphone hole 547*a*, 547*b* may be implemented into one hole, or a speaker may be included without the speaker hole 545*a*, 545*b* (e.g., a piezo speaker). According to an embodiment, the speaker hole indicated with reference numeral "545*b*" may be disposed on the first structure 501 to be used as a receiver hole for calling, and the speaker hole (for example, an external speaker hole) indicated with reference numeral "545*a*" or the microphone hole 547*a*, 547*b* may be disposed on the second structure 502 (e.g., one of the side walls 523*a*, 523*b*, and 523*c*).

The camera module 549 may be provided on the second structure 502 and may capture a subject in a direction opposite to the first area A1 of the display 503. The electronic device 500 may include a plurality of camera modules

549. For example, the electronic device 500 may include a wide angle camera, a telephoto camera, or a close-up camera, and may include, according to an embodiment, an infrared projector and/or an infrared receiver to measure a distance to a subject. The camera module 549 may include one or more lenses, an image sensor, and/or an image signal processor.

Although not shown, the electronic device 500 may further include a camera module (e.g., a front camera) to capture a subject in a direction opposite to the first area A1 of the display 503. For example, the front camera may be disposed around the first area A1 or in an area overlapping the display 503. When the front camera is disposed in the area overlapping the display 503, the front camera may capture a subject through the display 503.

According to various embodiments, the indicator (not shown) of the electronic device 500 may be disposed on, directly or indirectly, the first structure 501 and/or the second structure 502, and may include an LED to provide state information of the electronic device 500 in a form of a visual signal. In an embodiment, the sensor module (not shown) of the electronic device 500 may generate an electrical signal or a data value corresponding to an internal operation state or external environment state of the electronic device 500. The sensor module may include, for example, a proximity sensor, a fingerprint sensor, or a biosensor (for example, an iris/face recognition sensor or an HRM sensor). In another embodiment, the sensor module may further include at least one of, for example, a gesture sensor, a gyro sensor, an air pressure sensor, a magnetic sensor, an acceleration sensor, a grip sensor, a color sensor, an infrared (IR) sensor, a temperature sensor, a humidity sensor, or an illuminance sensor.

Figure 11:
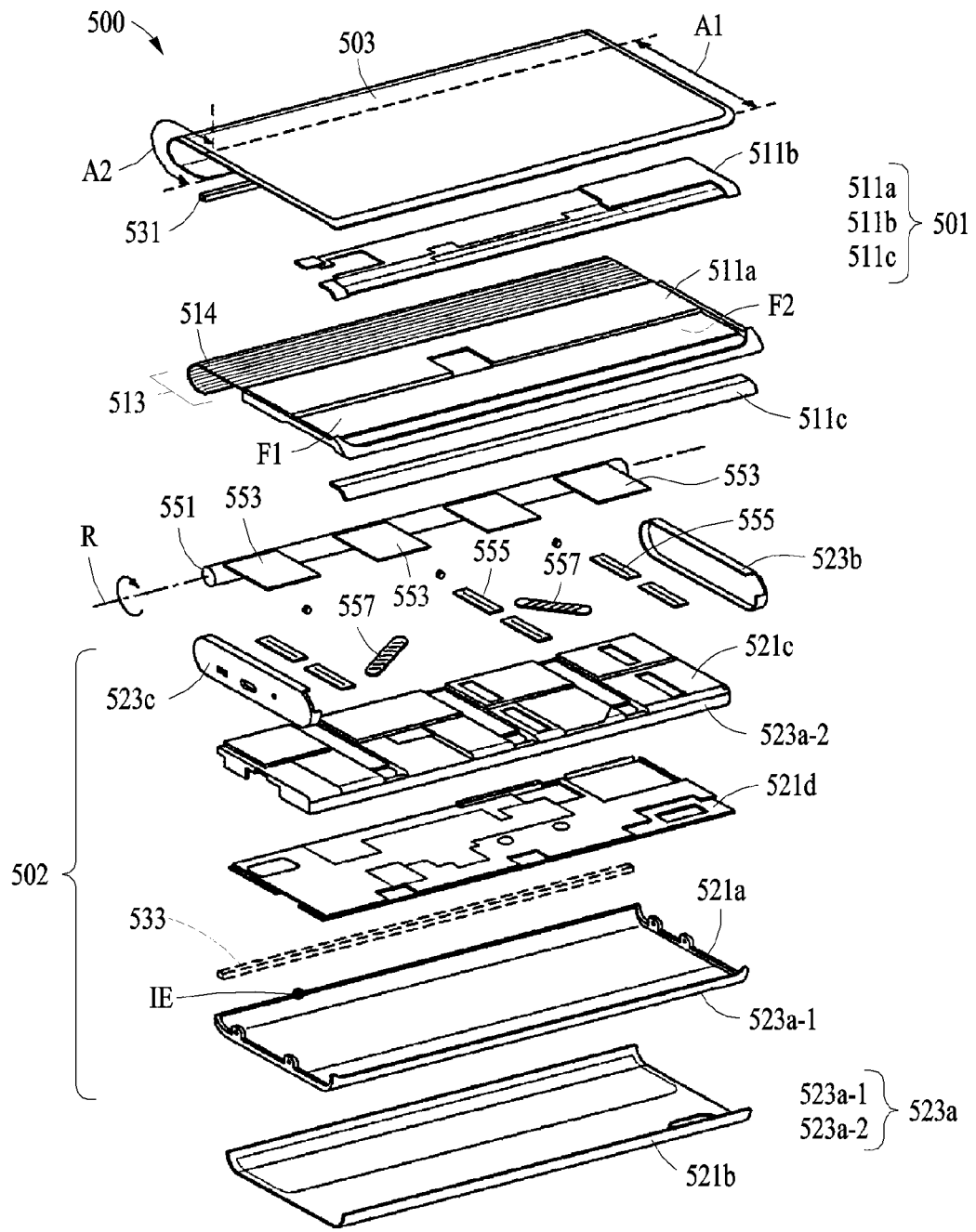
FIG. 11 is an exploded perspective view illustrating the electronic device of FIG. 9 or 10 according to various example embodiments.

FIG. 11 is an exploded perspective view illustrating an electronic device (e.g., the electronic device 500 of FIGS. 9 and 10) according to various embodiments disclosed herein.

Referring to FIG. 11, an electronic device 500 may include a first structure 501, a second structure 502 (e.g., a housing), a display 503 (e.g., a flexible display), and a guide member (e.g., a roller 551), a support sheet 553, and/or a multi-joint hinge structure 513. A portion (e.g., the second area A2) of the display 503 may be received inside the second structure 502 while being guided by the roller 551.

According to various embodiments, the first structure 501 may include a first plate 511*a* (e.g., a slide plate), a first bracket 511*b* and/or a second bracket 511*c* mounted to the first plate 511*a*. The first structure 501, for example, the first plate 511*a*, the first bracket 511*b*, and/or the second bracket 511*c* may be formed of a metal material and/or a non-metal (e.g., polymer) material. The first plate 511*a* may be mounted to the second structure 502 (e.g., the housing) to linearly reciprocate in one direction (e.g., in the direction indicated by the arrow ① in FIG. 9) while being guided by the second structure 502. In an embodiment, the first bracket 511*b* may be coupled to the first plate 511*a* to form a first surface F1 of the first structure 501 together with the first plate 511*a*. The first area A1 of the display 503 may be substantially mounted on the first surface F1 and maintained in a flat plate shape. The second bracket 511*c* may be coupled to the first plate 511*a* to form a second surface F2 of the first structure 501 together with the first plate 511*a*. According to an embodiment, the first bracket 511*b* and/or the second bracket 511*c* may be integrally formed with the first plate 511*a*. This may be properly designed in consideration of an assembly structure or a manufacturing process of a product to be manufactured. The first structure 501 or the first plate 511*a* may be coupled to the second structure 502 to slidably move with respect to the second structure 502.

According to various embodiments, the multi-joint hinge structure 513 may include a plurality of bars or rods 514 and may be connected to one end of the first structure 501. For example, as the first structure 501 slides, the multi-joint hinge structure 513 may move with respect to the second structure 502, and in a closed state (e.g., the state shown in FIG. 9), the multi-joint hinge structure 513 may be received inside the second structure 502. In some embodiments, even in the closed state, a portion of the multi-joint hinge structure 513 may not be received inside the second structure 502. For example, in the closed state, a portion of the multi-joint hinge structure 513 may be positioned to correspond to the roller 551 outside the second structure 502. The plurality of rods 514 may extend in a straight line to be disposed parallel to a rotation shaft R of the roller 551 and may be arranged in a direction perpendicular to the rotation shaft R, for example, a direction in which the first structure 501 slides.

According to various embodiments, each of the rods 514 may pivot around another adjacent rod 514 while remaining parallel to the other adjacent rod 514. Accordingly, as the first structure 501 slides, the plurality of rods 514 may be arranged to form a curved shape or a planar shape. For example, as the first structure 501 slides, a portion of the multi-joint hinge structure 513, which faces the roller 551, may form a curved surface, and a portion of the multi-joint hinge structure 513, which does not face the roller 551, may form a flat surface. In an embodiment, the second area A2 of the display 503 may be mounted to or supported by the multi-joint hinge structure 513. In an open state (e.g., the state shown in FIG. 2), the second area A2, along with the first area A1, may be exposed to the outside of the second structure 502. In a state in which the second area A2 is exposed to the outside of the second structure 502, the multi-joint hinge structure 513 may substantially form a flat surface, thereby supporting or maintaining the second area A2 in a flat state.

According to various embodiments, the second structure 502 (e.g., the housing) may include a second plate 521*a* (e.g., a rear case), a printed circuit board (PCB) (not shown), a rear plate 521*b*, a third plate 521*c* (e.g., a front case), and a support member 521*d*. The second plate 521*a*, for example, the rear case, may be disposed to face in a direction opposite to the first surface F1 of the first plate 511*a* and may substantially provide an external shape of the electronic device 500 or the second structure 502. In an embodiment, the second structure 502 may include a first side wall 523*a* extending from the second plate 521*a*, a second side wall 523*b* extending from the second plate 521*a* and substantially perpendicular to the first side wall 523*a*, and a third side wall 523*c* extending from the second plate 521*a*, substantially perpendicular to the first side wall 523*a*, and parallel to the second side wall 523*b*. Although an example of a structure of the second side wall 523*b* and the third side wall 523*c* manufactured as separate components from the second plate 521*a* and mounted or assembled to the second plate 521*a* is provided in the illustrated embodiment, the second side wall 523*b* and the third side wall 523*c* may be integrally formed with the second plate 521*a*. The second structure 502 may accommodate an antenna for proximity wireless communication, an antenna for wireless charging, or an antenna for magnetic secure transmission (MST) in a space that does not overlap the multi-joint hinge structure 513.

According to various embodiments, the rear plate 521*b* may be coupled to an outer surface of the second plate 521*a* and, according to an embodiment, may be manufactured integrally with the second plate 521*a*. In an embodiment, the second plate 521*a* may be formed of a metal or polymer material, and the rear plate 521*b* may be formed of a material such as a metal, glass, a synthetic resin, or ceramic, to provide a decorative effect in the exterior of the electronic device 500. According to an embodiment, the second plate 521*a* and/or the rear plate 521*b* may be formed of a material that transmits light at least partially (e.g., an auxiliary display area). For example, in a state in which a portion (e.g., the second area A2) of the display 503 is received inside the second structure 502, the electronic device 500 may output visual information using a partial area of the display 503 received inside the second structure 502. The auxiliary display area may provide the visual information output from the area received inside the second structure 502 to the outside of the second structure 502.

According to various embodiments, the third plate 521*c* may be formed of a metal or polymer material, and may be coupled to the second plate 521*a* (e.g., the rear case), the first side wall 523*a*, the second side wall 523*b*, and/or the third side wall 523*c* to form an inner space of the second structure 502. According to an embodiment, the third plate 521*c* may be referred to as a "front case", and the first structure 501, for example, the first plate 511*a* may slide in a state of substantially facing the third plate 521*c*. In some embodiments, the first side wall 523*a* may be formed by combining a first side wall portion 523*a*-1 extending from the second plate 521*a* and a second side wall portion 523*a*-2 formed at one edge of the third plate 521*c*. In another embodiment, the first side wall portion 523*a*-1 may be coupled to surround one edge of the third plate 521*c*, e.g., the second side wall portion 523*a*-2. In this case, the first side wall portion 523*a*-1 itself may form the first side wall 523*a*.

According to various embodiments, the support member 521*d* may be disposed in a space between the second plate 521*a* and the third plate 521*c* and may have a shape of a flat plate formed of a metal or polymer material. The support member 521*d* may provide an electromagnetic shielding structure in the inner space of the second structure 502 or may increase mechanical rigidity of the second structure 502. In an embodiment, when received inside the second structure 502, a partial area (e.g., the second area A2) of the display 503 and/or the multi-joint hinge structure 513 may be positioned in a space between the second plate 521*a* and the support member 521*d*.

According to various embodiments, the PCB (not shown) may be disposed in a space between the third plate 521*c* and the support member 521*d*. For example, the PCB may be received in a space separated from a space, in which a partial area of the display 503 and/or the multi-joint hinge structure 513 is received, by the support member 521*d* in the second structure 502. The PCB may be provided with a processor, a memory, and/or an interface mounted thereon. The processor may include, for example, at least one of a central processing unit (CPU), an application processor (AP), a graphics processing unit (GPU), an image signal processor (ISP), a sensor hub processor, or a communication processor (CP).

The memory may include, for example, a volatile memory or a non-volatile memory.

The interface may include, for example, a high-definition multimedia interface (HDMI), a universal serial bus (USB) interface, a secure digital (SD) card interface, and/or an audio interface. For example, the interface may electrically or physically connect the electronic device 500 to an external electronic device, and may include a USB connector, an SD card/multimedia card (MMC) connector, or an audio connector.

According to various embodiments, the display 503 is a flexible display based on an organic light-emitting diode, and may be at least partially deformed into a curved shape while being maintained in a planar shape as a whole. In an embodiment, the first area A1 of the display 503 may be mounted or attached to the first surface F1 of the first structure 501 and maintained in a substantially flat plate shape. The second area A2 may extend from the first area A1 and may be supported by or attached to the multi-joint hinge structure 513. For example, the second area A2 may extend in a direction in which the first structure 501 slides, may be received inside the second structure 502 together with the multi-joint hinge structure 513, and may be deformed to at least partially form a curved shape according to a deformation of the multi-joint hinge structure 513.

According to various embodiments, an area of the display 503 exposed to the outside may vary depending on the sliding movement of the first structure 501 on the second structure 502. The electronic device 500 (e.g., a processor) may change the area of the display 503 that is activated based on the area of the display 503 exposed to the outside. For example, in the opened state or at an intermediate position between the closed state and the opened state, the electronic device 500 may activate an area exposed to the outside of the second structure 502 in the total area of the display 503. In the closed state, the electronic device 500 may activate the first area A1 of the display 503 and deactivate the second area A2. In the closed state, if there is no user input for a predetermined amount of time (e.g., 30 seconds or 2 minutes), the electronic device 500 may deactivate the entire area of the display 503. In some embodiments, in a state in which the entire area of the display 503 is deactivated, the electronic device 500 may activate a partial area of the display 503 as occasion demands (e.g., notification according to a user setting, or notification of an unanswered call or message arrival) to provide visual information through an auxiliary display area (e.g., a portion of the second plate 121*a* a and/or the rear plate 521*b* formed of a material that transmits light).

According to various embodiments, in the opened state (e.g., the state shown in FIG. 10), substantially the entire area (e.g., the first area A1 and the second area A2) of the display 503 may be exposed to the outside, and the first area A1 and the second area A2 may be arranged to define a plane. In an embodiment, even in the opened state, a portion (e.g., one end portion) of the second area A2 may be positioned to correspond to the roller 551, and a portion of the second area A2 corresponding to the roller 551 may be maintained in a curved shape. For example, in various embodiments disclosed herein, even when it is described that "in the opened state, the second area A2 is disposed to define a plane", a portion of the second area A2 may be maintained in a curved shape. Similarly, although it is described that "in the closed state, the multi-joint hinge structure 513 and/or the second area A2 are received inside the second structure 502", a portion of the second area A2 and/or the multi-joint hinge structure 513 may be positioned outside the second structure 502.

According to various embodiments, a guide member, for example, the roller 551, may be rotatably mounted to the second structure 502 at a position adjacent to one side edge of the second structure 502 (e.g., the second plate 121*a*). For example, the roller 551 may be disposed adjacent to an edge (e.g., a portion denoted by reference numeral 'IE') of the second plate 521a parallel to the first side wall 523a. Although a reference numeral is not imparted, another side wall may extend from an edge of the second plate 521a adjacent to the roller 551, and a side wall adjacent to the roller 551 may be substantially parallel to the first side wall 523a. As described above, the side wall of the second structure 502 adjacent to the roller 551 may be manufactured using a material that transmits light, and a portion of the second area A2 in a state of being received in the second structure 502 may provide visual information through a portion of the second structure 502 in the state of being received in the second structure 502.

According to various embodiments, one end portion of the roller 551 may be rotatably coupled to the second side wall 523b and the other end portion thereof may be rotatably coupled to the third side wall 523c. For example, the roller 551 may be mounted to the second structure 502 to rotate around a rotation shaft R substantially perpendicular to a direction (e.g., the direction indicated by arrow ① in FIG. 9 or 10) in which the first structure 501 slides. The rotation shaft R may be disposed substantially parallel to the first side wall 523a, and may be positioned far from the first side wall 523a, for example, at one side edge of the second plate 521a. In an embodiment, a spacing formed between an outer circumferential surface of the roller 551 and an inner surface of an edge of the second plate 521a may form an entrance through which the multi-joint hinge structure 513 or the display 503 enters the inside of the second structure 502.

According to various embodiments, when the display 503 is deformed into a curved shape, the roller 551 may suppress excessive deformation of the display 503 by maintaining a curvature radius of the display 503 to a predetermined level. The "excessive deformation" may indicate that the display 503 is deformed to have an excessively small curvature radius to an extent that a pixel or a signal wire included in the display 503 is damaged. For example, the display 503 may be moved or deformed while being guided by the roller 551 and may be protected from being damaged due to excessive deformation. In some embodiments, the roller 551 may rotate while the multi-joint hinge structure 513 or the display 503 is inserted into or drawn out of the second structure 502. For example, the multi-joint hinge structure 513 (or the display 503) may be smoothly inserted into/drawn out of the second structure 502 by suppressing friction between the multi-joint hinge structure 513 (or the display 503) and the second structure 502.

According to various embodiments, the support sheet 553 may be formed of a substance including a material having flexibility and a predetermined degree of elasticity, for example, an elastic body such as silicone or rubber, and may be mounted or attached to the roller 551 to be selectively wound around the roller 551 as the roller 551 rotates. In the illustrated embodiment, a plurality of (e.g., four) support sheets 553 may be arranged in a direction of the rotation shift R of the roller 551. For example, the plurality of support sheets 553 may be mounted on the roller 551 at a predetermined interval from other adjacent support sheets 553 and may extend in a direction perpendicular to the rotational shaft R. In another embodiment, one support sheet may be mounted or attached to the roller 551. For example, one support sheet may have a size and shape corresponding to an area in which the support sheets 553 are arranged and areas between the support sheets 553 in FIG. 3. Thus, a number, a size, or a shape of support sheets 553 may be properly changed depending on an actually manufactured product. In some embodiments, as the roller 551 rotates, the support sheet 553 may be rolled up on the outer circumferential surface of the roller 551 or may be spread out from the roller 551 in a flat plate shape from a space between the display 503 and the third plate 521c. In another embodiment, the support sheet 553 may be referred to as a "support belt", an "auxiliary belt", a "support film" or an "auxiliary film".

According to various embodiments, an end portion of the support sheet 553 may be connected, directly or indirectly, to the first structure 501, for example, the first plate 511a (e.g., a slide plate), and the support sheet 553 may be rolled around the roller 551 in the closed state (e.g., the state shown in FIG. 1). Accordingly, when the first plate 511a moves to the opened state (e.g., the state shown in FIG. 10), the support sheet 553 may be gradually positioned between the second structure 502 (e.g., the third plate 521c) and the display 503 (e.g., the second area A2) or between the second structure 502 (e.g., the third plate 521c) and the multi-joint hinge structure 513. For example, at least a portion of the support sheet 553 may be positioned to face the multi-joint hinge structure 513 and may be selectively wound around the roller 551 according to the sliding movement of the first plate 511a. The support sheet 553 may be generally disposed to be in contact with the multi-joint hinge structure 513, however, a portion of the support sheet 553 rolled around the roller 551 may be substantially separated from the multi-joint hinge structure 513.

According to various embodiments, a spacing (e.g., an arrangement spacing (not shown)) between a surface of the display 503 and an inner surface of an edge of the second plate 521a may vary depending on a degree to which the support sheet 553 is wound around the roller 551. The smaller the arrangement spacing, the easier it is to prevent or reduce introduction of foreign substances. However, if the arrangement spacing is extremely reduced, the display 503 may contact or rub against the second plate 521a. When direct contact or rubbing occurs, the surface of the display 503 may be damaged or the sliding of the first structure 501 may be hindered.

According to various embodiments, since the support sheet 553 is wound around the roller 551 in the closed state, it may be possible to reduce the spacing between the surface of the display 503 and the inner surface of the edge of the second plate 521a while maintaining a state in which the surface of the display 503 is not in contact with the second plate 521a. For example, by reducing the arrangement spacing in the closed state, it may be possible to block introduction of foreign substances into the second structure 502. In an embodiment, as the first structure 501 (e.g., the first plate 511a or the slide plate) gradually moves to the opened state, the support sheet 553 may move away from the roller 551 to gradually move to a space between the second structure 502 (e.g., the second plate 521a or the third plate 521c) and the multi-joint hinge structure 513. For example, as the first structure 501 moves to the opened state, the arrangement spacing may gradually increase, to suppress direct friction or contact between the display 503 and another structure (e.g., the second plate 521a), and prevent or reduce the chances of the surface of the display 503 from being damaged due to friction or contact. In some embodiments, a thickness of the support sheet 553 may gradually increase from one end (e.g., a portion fixed to the roller 551) toward another end (e.g., a portion fixed to the first plate 511a). Using such thickness profile of the support sheet 553, the arrangement spacing in the closed state and the opened state may be adjusted.

According to various embodiments, the electronic device 500 may include at least one elastic member 531, 533 manufactured using a low-density elastic body, such as a sponge, or a brush. For example, the electronic device 500 may include a first elastic member 531 mounted on one end of the display 503 and, according to an embodiment, may further include a second elastic member 533 mounted on the inner surface of the edge of the second plate 521*a*. The first elastic member 531 may be substantially disposed in the inner space of the second structure 502 and may be positioned to correspond to the edge of the second plate 521*a* in the opened state (e.g., the state shown in FIG. 10). In an embodiment, the first elastic member 531 may move in the inner space of the second structure 502 according to the sliding movement of the first structure 501. When the first structure 501 moves from the closed state to the open state, the first elastic member 531 may move toward the edge of the second plate 521*a*. When the first structure 501 reaches the opened state, the first elastic member 531 may contact the inner surface of the edge of the second plate 521*a*. For example, in the opened state, the first elastic member 531 may seal the spacing between the surface of the display 503 and the inner surface of the edge of the second plate 521*a*. In another embodiment, when moving from the closed state to the open state, the first elastic member 531 may move (e.g., slide contact) while contacting the second plate 521*a*. For example, if foreign substances are introduced into the spacing between the second area A2 and the second plate 521*a* in the closed state, the first elastic member 531 may allow the foreign substances to be discharged from the second structure 502 when moving to the opened state.

According to various embodiments, the second elastic member 533 may be attached to the inner surface of the second plate 521*a* and may be disposed to substantially face an inner surface of the display 503. In the closed state, the spacing (e.g., the arrangement spacing) between the surface of the display 503 and the inner surface of the edge of the second plate 521*a* may be substantially determined by the second elastic member 533. According to an embodiment, in the closed state, the second elastic member 533 may contact the surface of the display 503 to substantially seal the arrangement spacing. According to an embodiment, the second elastic member 533 may be manufactured using a low-density elastic body, such as a sponge, or a brush, to prevent or reduce the surface of the display 503 from being damaged even though the second elastic member 533 directly contacts the display 503. In another embodiment, the arrangement spacing may increase as the first structure 501 gradually moves to the opened state. For example, the second area A2 of the display 503 may be gradually exposed to the outside of the second structure 502 without substantially contacting or rubbing against the second elastic member 533. When the first structure 501 reaches the opened state, the first elastic member 531 may contact the second elastic member 533. For example, in the opened state, the first elastic member 531 and the second elastic member 533 may block the introduction of foreign substances by sealing the arrangement spacing.

According to various embodiments, the electronic device 500 may further include a guide rail(s) 555 and/or an actuating member(s) 557. The guide rail(s) 555 may be mounted on the second structure 502, for example, the third plate 521*c* to guide the sliding movement of the first structure 501 (e.g., the first plate 511*a* or a slide plate). The actuating member(s) 557 may include a spring or a spring module that provides an elastic force in a direction to move opposite ends thereof away from each other. One end of the actuating member(s) 557 may be rotatably supported by the second structure 502, and the other end thereof may be rotatably supported by the first structure 501. When the first structure 501 slides, the opposite ends of the actuating member(s) 557 may be located closest to each other at any one point (hereinafter, referred to as a "closest point") between the closed state and the opened state. For example, in a section between the closest point and the closed state, the actuating member(s) 557 may provide an elastic force to the first structure 501 in a direction to move toward the closed state, and in a section between the closest point and the opened state, the actuating member(s) 557 may provide an elastic force to the first structure 501 in a direction to move toward the opened state.

Figure 12:
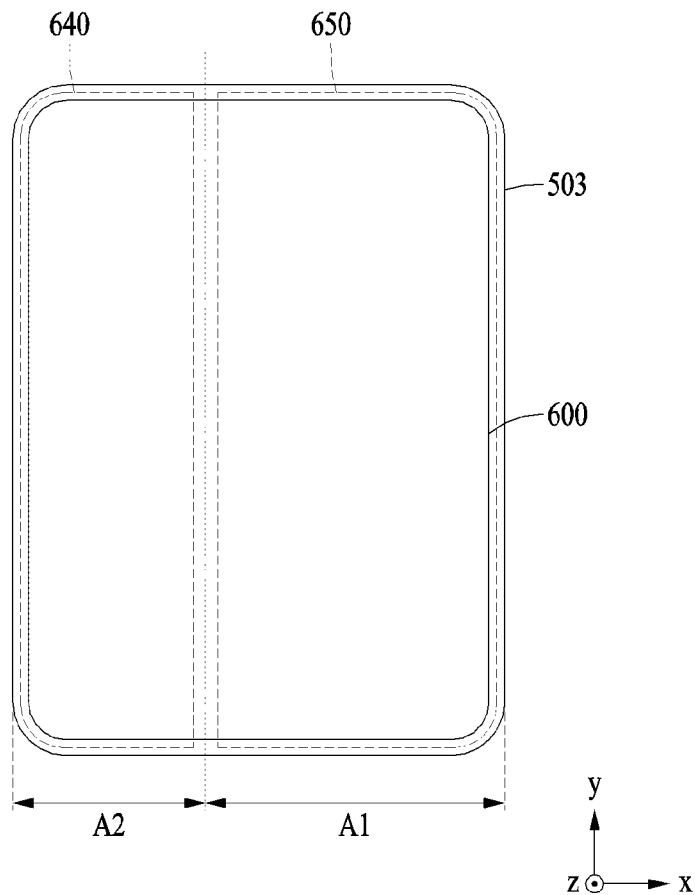
FIG. 12 illustrates a front surface of a display on which a window is disposed and a cross section of a structure of the display on which the window is disposed, according to various example embodiments.
Figure 12:
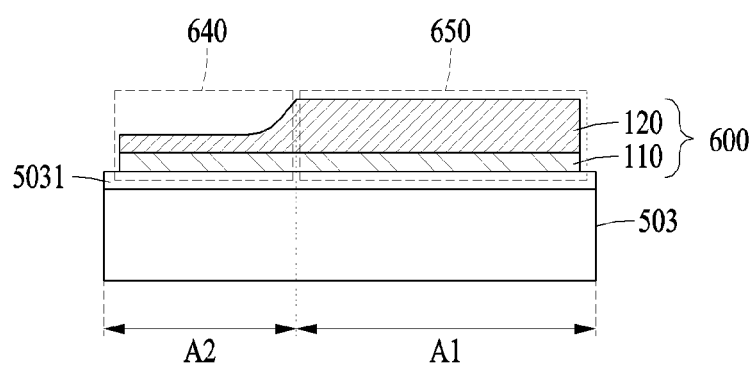

FIG. 12 illustrates a front surface of a display on which a window is disposed and a cross section of a structure of the display on which the window is disposed, according to various embodiments. For example, the front surface of the display of FIG. 12 is in an opened state (e.g., the state shown in FIG. 10), and the cross section is taken along an x-axis.

A second window 600 of FIG. 12 may be at least partially similar to the window 100 of FIGS. 1 to 3C or may further include other embodiments of the window. The display 503 of FIG. 12 may be at least partially similar to the display 200 of FIGS. 3A to 3C or may further include other embodiments of the display.

Referring to FIG. 12, according to various embodiments, the display 503 may include a first window 5031, and the second window 600 having a variable thickness may be disposed on the display 503. The second window 600 may cover at least a portion of the first window 5031.

According to various embodiments, the second window 600 may be formed with a stack structure of a film layer 110 and a polymer layer 120. The second window 600 may further include a coating layer (e.g., the coating layer 130 of FIG. 2) formed by coating a surface of the polymer layer 120.

According to various embodiments, the second window 600 may include a sliding portion 640, and a planar portion 650. The planar portion 650 may be disposed on, directly or indirectly, a first area A1 that substantially maintains a planar shape at all times even when the first structure 501 slides. The sliding portion 640 may extend from the planar portion 650 and may be disposed on a second area A2 of the display 503 that maintains a curved shape or a planar shape according to the sliding movement of the first structure 501 (see FIG. 10).

According to various embodiments, the sliding portion 640 may be inserted or received inside the second structure 502 (see FIG. 10) or may be exposed to the outside of the second structure 502 according to the sliding movement of the first structure 501. The second area A2 may move while being substantially guided by the roller 551 (see FIG. 11) mounted to the second structure 502, the sliding portion 640 may also be received inside the second structure 502 or exposed to the outside of the second structure 502. While the first structure 501 slides, a portion of the sliding portion 640 may be deformed into a curved shape at a position corresponding to the roller 551.

According to various embodiments, if the first structure 501 moves from the closed state to the opened state, the sliding portion 640 may substantially form a flat surface together with the planar portion 650 while the sliding portion 640 is being gradually exposed out of the second structure 502.

According to various embodiments, each of the first window 5031, the display 503, and the polymer layer 120 may include a deformation portion (e.g., the second area A2, and the sliding portion 640), and a planar portion (e.g., the first area A1, and the planar portion 650) disposed on at least one side based on the deformation portion. The deformation portion and the planar portion may correspond to each other. A pattern may be formed in at least a partial area of a surface of the polymer layer 120 facing a direction opposite to a surface facing the first window 5031. The pattern may include a recess pattern formed in a sliding direction. The recess pattern may coincide with a boundary of the sliding portion 640 and may be formed to include a portion of the planar portion 650 beyond the boundary of the sliding portion 640.

According to various embodiments, the sliding portion 640 may include a step formed by the recess pattern of the polymer layer 120. The step formed in the sliding portion 640 may be based on a thickness difference between a portion of the polymer layer 120 corresponding to the sliding portion 640 and a portion of the polymer layer 120 corresponding to the planar portion 650, and thus the second window 600 may have a variable thickness. A thickness of the step formed in the sliding portion 640 may be uniform, or may increase as a distance from the planar portion 650 increases. The step formed in the sliding portion 640 may have an elliptical concave shape and may include various shapes such as a trapezoidal shape and a quadrangular shape.

According to various embodiments, the pattern of the polymer layer 120 may include at least one uneven pattern formed in the planar portion 650 and the sliding portion 640. By forming at least one uneven pattern in the sliding portion 640 and the planar portion 650 in the second window 600, a visibility may be improved and a feeling in use of a pen may be enhanced.

According to various embodiments, a surface of at least one of the film layer 110 and the polymer layer 120 facing the first window 5031 may be flat across the sliding portion 640 and the planar portion 650. A surface of the first window 5031 facing the polymer layer 120 may be flat across the first area A1 and the second area A2.

Figure 13A:
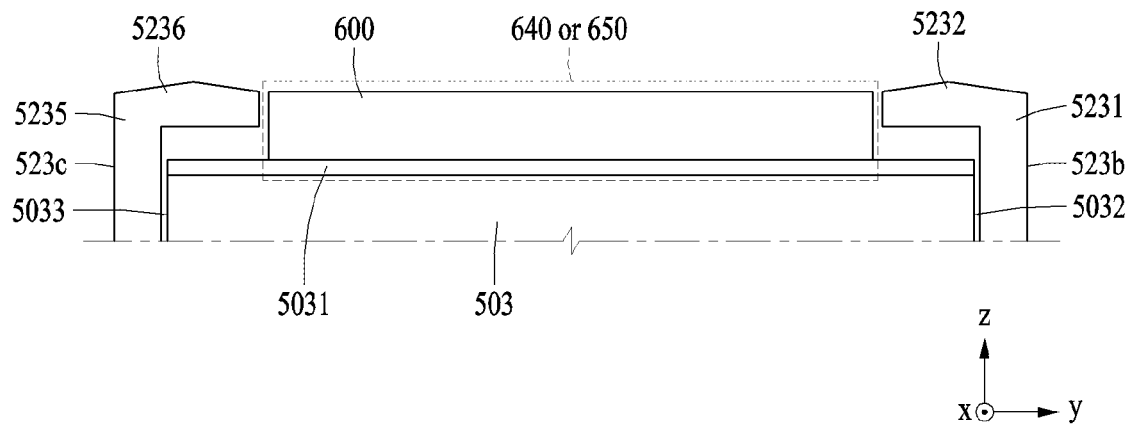
FIG. 13A illustrates an example of a cross section of an electronic device according to various example embodiments.

FIG. 13A illustrates an example of a cross section of an electronic device according to various embodiments. For example, FIG. 13A is a cross-sectional view showing a portion of a cross section of the electronic device 500 taken along line II-II of FIG. 10.

Referring to FIG. 13A, according to various embodiments, the display 503 may be disposed in a space formed by the second side wall 523b and the third side wall 523c. In a closed state (e.g., the state shown in FIG. 9), an opened state (e.g., the state shown in FIG. 10), and an intermediate position between the closed state and the opened state, at least a portion of the first area A1 of the display 503 and at least a portion of the second area A2 may be in the space formed by the side walls 523b and 523c.

According to various embodiments, the second side wall 523b may include a first side member 5231 and a first housing decoration 5232. The first side member 5231 may extend along a first side 5032 of the display 503. The first housing decoration 5232 may extend from an upper end of the first side member 5231 in a direction to cover at least a partial area of the display 501.

According to various embodiments, the third side wall 523c may include a second side member 5235 and a second housing decoration 5236. The second side member 5235 may extend along a second side 5033 of the display 503. The second housing decoration 5236 may extend from an upper end of the second side member 5235 in a direction to cover at least a partial area of the display 503.

According to various embodiments, the electronic device 500 may include the second window 600 that is disposed on the display 503 to cover at least a partial area of the display 503. The second window 600 may include the sliding portion 640 and/or the planar portion 650. In a closed state (e.g., the state shown in FIG. 9), an opened state (e.g., the state shown in FIG. 10), and an intermediate position of the opened state, at least a portion of the sliding portion 640 of the second window 600 and at least a portion of the planar portion 650 may be in the space formed by the side walls 523b and 523c. As the first structure 501 slides on the second structure 502, at least a portion of the sliding portion 640 of the second window 600 and at least a portion of the planar portion 650 may move in the space formed by the side walls 523b and 523c.

According to various embodiments, the second window 600 may be disposed not to be covered by the housing decorations 5232 and 5236. The second window 600 may be replaced with another second window 600.

Figure 13B:
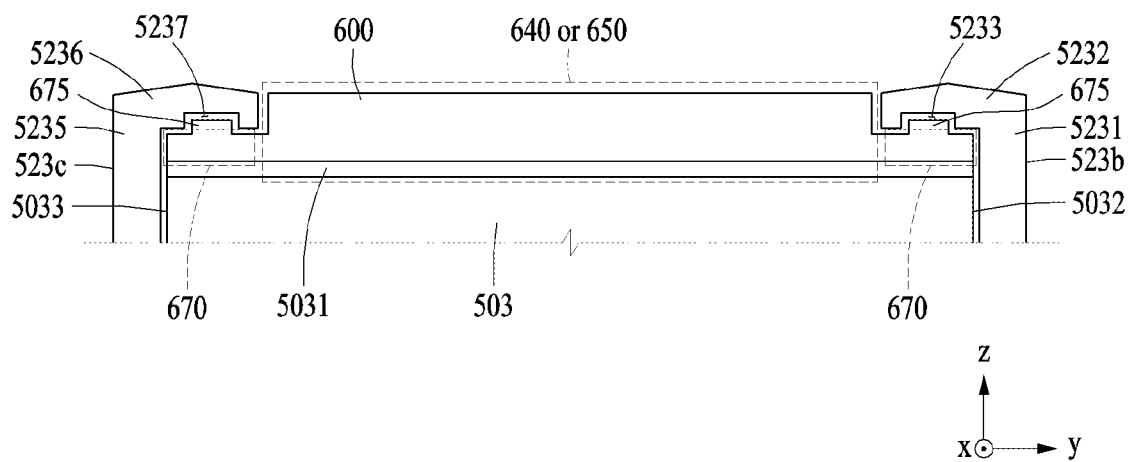
FIG. 13B illustrates another example of a cross section of an electronic device according to various example embodiments.

FIG. 13B illustrates another example of a cross section of an electronic device according to various embodiments.

Referring to FIG. 13B, according to various embodiments, unlike the second window 600 illustrated in FIG. 13A, the second window 600 may be disposed so that the second window 600 may be shielded from the outside by the housing decorations 5232 and 5236.

According to various embodiments, the second window 600 may include the sliding portion 640, the planar portion 650, and the side portion 670. The side portion 670 may be an edge area of the second window 600 extending in a y-axis direction from each of the sliding portion 640 and the planar portion 650. At least a portion of the side portion 670 may be covered by the housing decorations 3131 and 3231. As shown in FIG. 13B, at least a partial area of the second window 600, for example, the side portion 670, may be shielded from the outside by the housing decorations 5232 and 5236, and the second window 600 may not be replaceable.

According to various embodiments, the side portion 670 may include a step formed due to a recess pattern formed in an edge area of the polymer layer 120. A height of the step formed in the side portion 670 may be greater than a height of the step formed in the sliding portion 640. A portion of the polymer layer 120 corresponding to the side portion 670 may be covered by the housing decorations 5232 and 5236. If a height of the polymer layer 120 is reduced by forming a relatively large number of steps compared to the sliding portion 640, the total thickness may be reduced, and a step between the second window 600 and the housing decorations 5232 and 5236 may be reduced.

According to another embodiment, in the side portion 670 of the polymer layer 120 constituting the second window 600, a protrusion pattern that protrudes from a surface facing a direction opposite to a surface facing the first window 5031 to be insertable into a receiving groove (e.g., a receiving groove 5233, 5237) may be formed. The protrusion pattern may include the protrusion 675. The protrusion 675 may protrude from a surface (e.g., a z-axis direction) facing a direction opposite to a surface facing the display 503 in the side portion 670.

According to another embodiment, the first housing decoration 5232 may include a first receiving groove 5233 formed by recessing at least a portion of the surface facing the display 503 inward. The second housing decoration 5232 may include a second receiving groove 5237 formed by recessing at least a portion of the surface facing the display 503 inward. The protrusion 675 may be inserted into the receiving groove 5233, 5237. As the first structure 501 slides on the second structure 502, the protrusion 675 may move along the receiving groove 5233, 5237 in a state of being inserted into the receiving groove 5233, 5237. The receiving groove 5233, 5237 formed in the housing decoration 5232, 5236 and the protrusion 675 inserted into the receiving groove 5233, 5237 in the second window 600 may be formed in a rail structure, thereby preventing or reducing a phenomenon in which the display 503 is separated. In addition, as the first structure 501 slides on the second structure 502, lifting of the display 503 due to a repulsive force may be improved through the rail structure.

Figure 14:
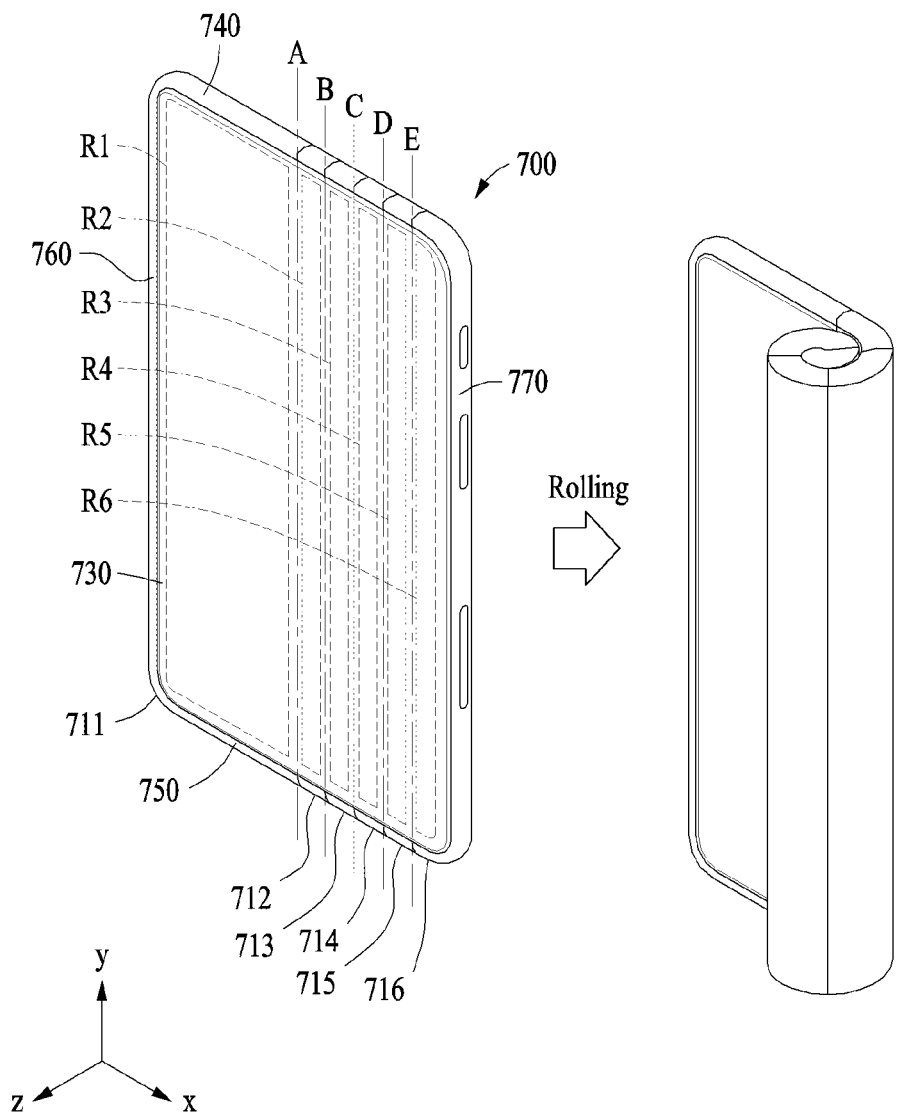
FIG. 14 illustrates an example of an electronic device according to various example embodiments.

FIG. 14 illustrates an example of an electronic device according to various embodiments.

Referring to FIG. 14, according to various embodiments, an electronic device 700 may be a rollable-type electronic device. The electronic device 700 may be rolled about axes A, B, C, D, and E. FIG. 14 shows a structure of a rollable electronic device that is rolled about five axes A, B, C, D, and E, however, embodiments are not necessarily limited thereto. The electronic device may be implemented as a rollable electronic device that is rolled about at least two axes.

According to various embodiments, the electronic device 700 may include a first housing structure 711, a second housing structure 712, a third housing structure 713, a fourth housing structure 714, a fifth housing structure 715, and a sixth housing structure 716. The housing structures 711 to 716 may include a first side member 740 and a second side member 750 extending in a direction perpendicular to the axes A, B, C, D, and E. The first housing structure 711 may include a third side member 760 extending in a direction parallel to the axes A, B, C, D, and E. The sixth housing structure 716 may include a fourth side member 770 extending in the direction parallel to the axes A, B, C, D, and E.

According to various embodiments, the first housing structure 711, the second housing structure 712, the third housing structure 713, the fourth housing structure 714, the fifth housing structure 715, and the sixth housing structure 716 may be implemented as an integral housing structure. The first side member 740 and the second side member 750 may be segmented based on each of the axes A, B, C, D, and E, such that the second housing structure 712, the third housing structure 713, the fourth housing structure 714, the fifth housing structure 715, and the sixth housing structure 716 may be implemented as separate housing structures.

According to various embodiments, the display 730 may be disposed over an entire surface of the first housing structure 711, the second housing structure 712, the third housing structure 713, the fourth housing structure 714, the fifth housing structure 715, and the sixth housing structure 716. The display 730 may be at least partially deformed into a curved shape while being maintained in a planar shape as a whole. The display 730 may have a structure of a rollable display that may be rolled around the five axes A, B, C, D, and E, and may be divided into the first region R1 disposed on the first housing structure 711, the second region R2 disposed on the second housing structure 712, the third region R3 disposed on the third housing structure 713, and the fourth region R4 disposed on the fourth housing structure 714, the fifth region R5 disposed on the fifth housing structure 715, and the sixth region R6 disposed on the sixth housing structure 716. The first region R1 may be maintained in a substantially flat plate shape. The second region R2 to the sixth region R6 may rolling regions that extend from the first region R1 or that may be wound around the first region R1 according to directions of rolling movements of the second housing structure 712 to the sixth housing structure 716. The second region R2 to the sixth region R6 may be at least partially deformed to form a curved shape along the rolling axes A, B, C, D, and E.

According to various embodiments, as the second housing structure 712 to the sixth housing structure 716 are rolled in a direction from the first axis A to the fifth axis E, or from the fifth axis E to the first axis, an area of the display 730 exposed to the outside may change. The electronic device 700 (e.g., a processor) may change an area of the display 730 activated based on the area of the display 730 exposed to the outside. For example, in a state in which the second housing structure 712 to the sixth housing structure 716 are rolled and wound up to the first axis A, the electronic device 700 may activate the first region R1 of the display 730 and deactivate the second region R2 to the sixth region R6. In a state in which the second housing structure 712 to the sixth housing structure 716 are rolled up to the fifth axis E and spread out, the electronic device 700 may activate the first region R1 to the sixth region R6 of the display 730.

According to various embodiments, when the second housing structure 712 to the sixth housing structure 716 being rolled and wound up to the first axis A are rolled in the direction from the first axis A to the fifth axis E, the electronic device 700 may sequentially activate regions exposed to the outside among the second region R2 to the sixth region R6. In addition, when the second housing structure 712 to the sixth housing structure 716 being rolled up to the fifth axis E and spread out are rolled in the direction from the fifth axis E to the first axis A, the electronic device 700 may sequentially deactivate regions that are not exposed to the outside among the second region R2 to the sixth region R6.

Figure 15:
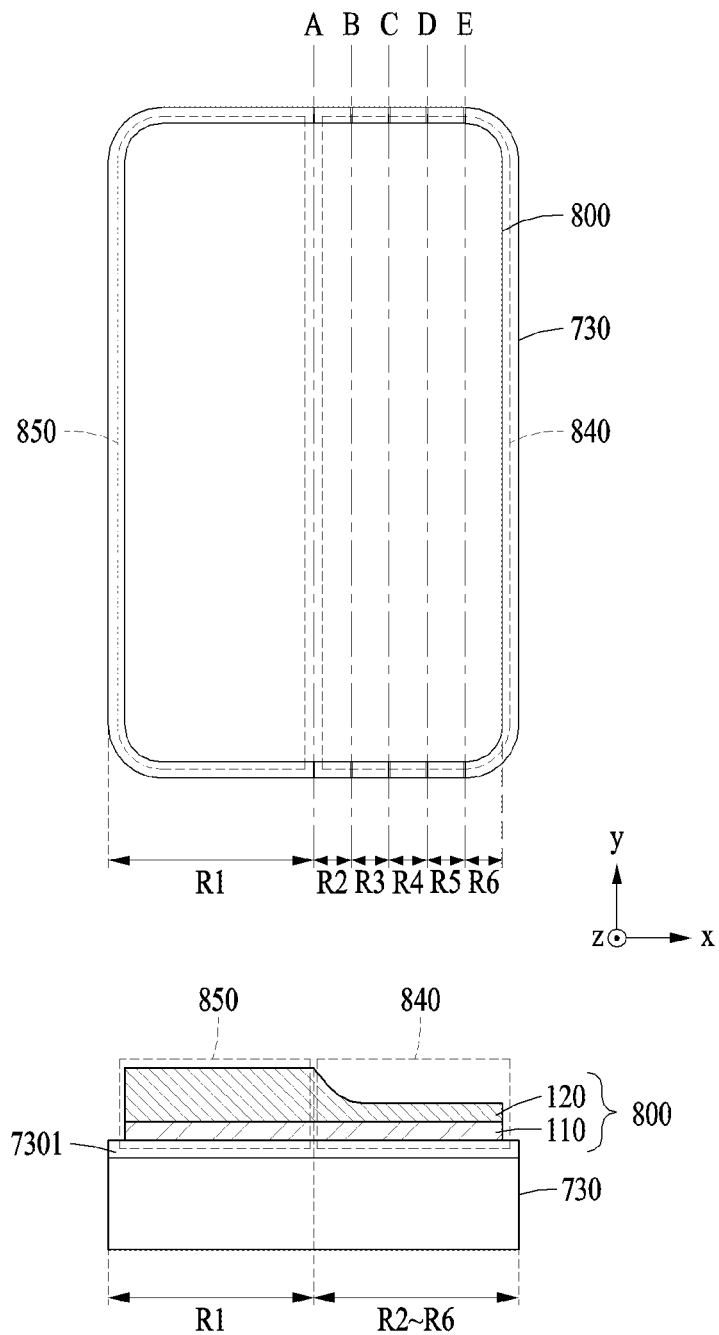
FIG. 15 illustrates a front surface of a display on which a window is disposed and a cross section of a structure of the display on which the window is disposed, according to various example embodiments.

FIG. 15 illustrates a front surface of a display on which a window is disposed and a cross section of a structure of the display on which the window is disposed, according to various embodiments. For example, FIG. 15 is a cross-sectional view taken along the x-axis.

A second window 800 of FIG. 15 is at least partially similar to the window 100 of FIG. 1 or 2 or may further include other embodiments of the window. The display 730 of FIG. 12 may be at least partially similar to the display 200 of FIGS. 3A to 3C or may further include other embodiments of the display.

Referring to FIG. 15, according to various embodiments, the display 730 may include a first window 7301, and the second window 800 having a variable thickness may be disposed on the display 730. The second window 800 may cover at least a portion of the first window 7301.

According to various embodiments, the second window 800 may be formed with a stack structure of a film layer 110 and a polymer layer 120. The second window 800 may further include a coating layer (e.g., the coating layer 130 of FIG. 2) formed by coating a surface of the polymer layer 120.

According to various embodiments, the second window 800 may include a rolling portion 840 and a planar portion 850. The planar portion 850 may be disposed on, directly or indirectly, the first region R1 that substantially remains in the planar shape even when the housing structures 712 to 716 (see FIG. 14) are rolled. The rolling portion 840 may extend from the planar portion 850 and may be disposed on, directly or indirectly, the rolling regions R2 to R6 of the display 503 that remains in a curved shape or a planar shape according to the rolling movement of the housing structures 712 to 716.

According to various embodiments, the rolling portion 840 may not be exposed to the outside or may be exposed to the outside according to the rolling movement of the housing structures 712 to 716. During the rolling movement of the housing structures 712 to 716, a portion of the rolling portion 840 positioned on each axis may be deformed into a curved shape at a rolling position.

According to various embodiments, each of the first window 7301, the display 730, and the polymer layer 120 may include a deformation portion (e.g., the second region R2 to the sixth region R6, and the rolling portion 840) corresponding to a deformation axis (e.g., the axes A, B, C, D, and E for rolling movements), and a planar portion (e.g., the first region R1, and the planar portion 850) disposed on, directly or indirectly, at least one side based on the deformation portion. The deformation portion and the planar portion may correspond to each other. A pattern may be formed in at least a partial area of a surface of the polymer layer 120 facing a direction opposite to a surface facing the first window 7301. The pattern may include a recess pattern formed in a lengthwise direction of the axes A, B, C, D, and E for the rolling movements. The recess pattern may coincide with a boundary of the rolling portion 840 and may be formed to include a portion of the planar portion 850 beyond the boundary of the rolling portion 840.

According to various embodiments, the rolling portion 840 may include a step formed by the recess pattern of the polymer layer 120. The step formed in the rolling portion 840 may be based on a thickness difference between a portion of the polymer layer 120 corresponding to the rolling portion 840 and a portion of the polymer layer 120 corresponding to the planar portion 850, and thus the second window 800 may have a variable thickness. A thickness of the step formed in the rolling portion 840 may be uniform, or may increase as a distance from the planar portion 850 increases. The step formed in the rolling portion 840 may have an elliptical concave shape and may include various shapes such as a trapezoidal shape and a quadrangular shape.

According to various embodiments, the pattern of the polymer layer 120 may include at least one uneven pattern formed in the planar portion 850 and the rolling portion 840. By forming at least one uneven pattern in the rolling portion 840 and the planar portion 850 in the second window 800, a visibility may be improved and a feeling in use of a pen may be enhanced.

According to various embodiments, a surface of at least one of the film layer 110 and the polymer layer 120 facing the first window 7301 may be flat across the rolling portion 840 and the planar portion 850. A surface of the first window 7301 facing the polymer layer 120 may be flat across the regions R1 to R6.

Figure 16A:
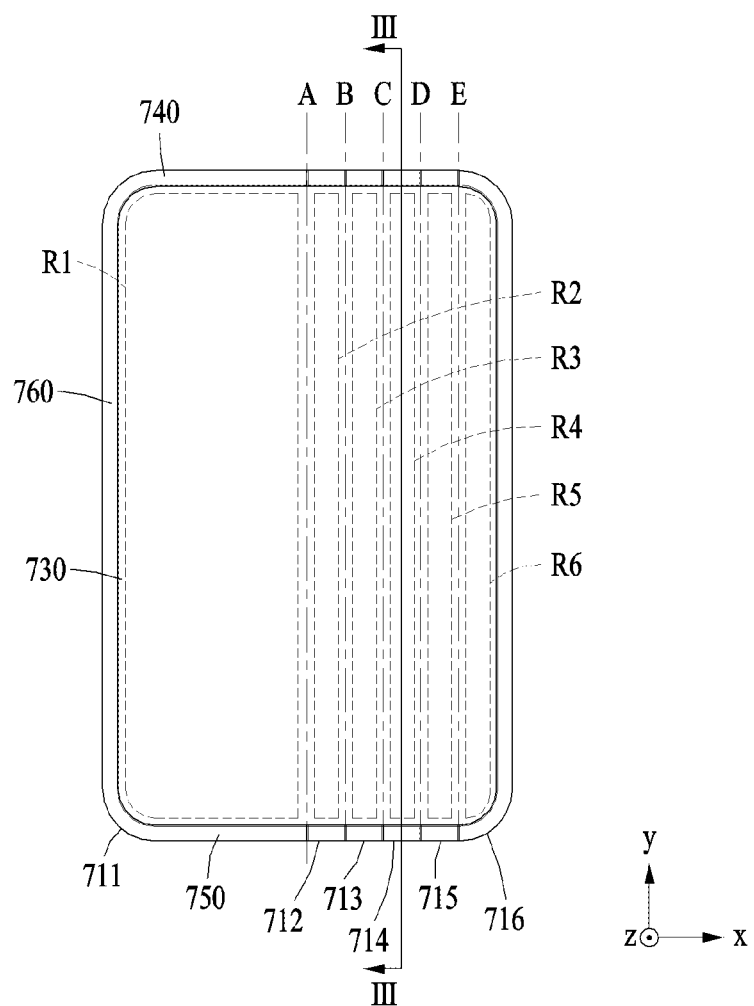
FIG. 16A is a diagram illustrating a front surface of an electronic device according to various example embodiments.
Figure 16B:
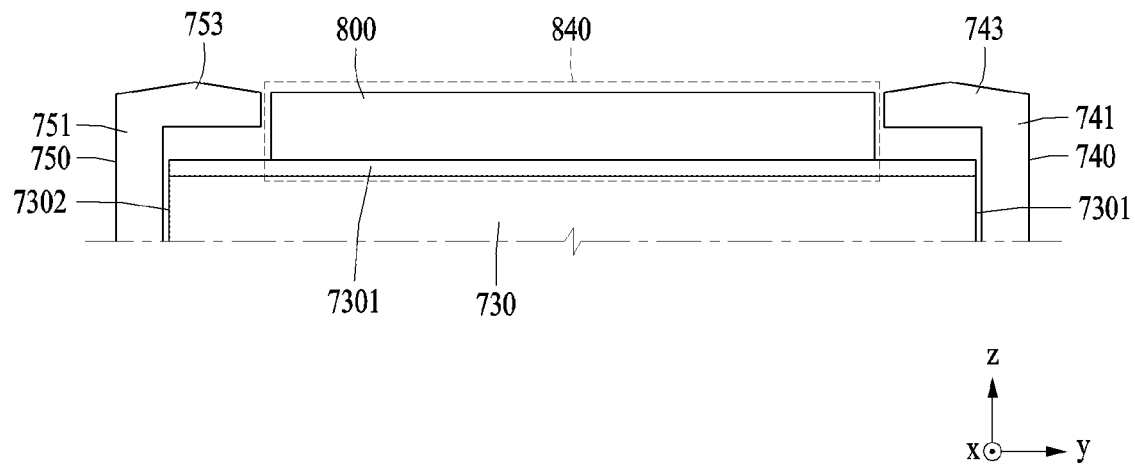
FIG. 16B illustrates an example of a cross section of an electronic device according to various example embodiments taken along a cut line of FIG. 16A.

FIG. 16A is a diagram illustrating a front surface of an electronic device according to various embodiments. FIG. 16B illustrates an example of a cross section of an electronic device according to various embodiments. For example, FIG. 16B is a cross-sectional view showing a portion of a cross section of the electronic device 700 taken along line III-III of FIG. 16A.

Referring to FIGS. 16A and 16B, according to various embodiments, the housing structures 712 to 716 may include the first side member 740 and the second side member 750. The rolling regions R2 to R6 of the display 730 may be positioned in a space formed by the first side member 740 and the second side member 750 of the housing structures 712 to 716.

According to various embodiments, the first side member 740 may extend along a first side surface 7301 of the display 730. The first side member 740 may include a first housing decoration 743. The first housing decoration 743 may extend from an upper end of the first side member 740 in a direction to cover at least a partial area of the display 730.

According to various embodiments, the second side member 750 may extend along a second side surface 7302 of the display 730. The second side member 750 may include a second housing decoration 753. The second housing decoration 753 may extend from an upper end of the second side member 750 in a direction to cover at least a partial area of the display 730.

According to various embodiments, the electronic device 700 may include the second window 800 that is disposed on the display 730 to cover at least a partial area of the display 730. The second window 800 may include the rolling portion 840 and/or the planar portion 850. The rolling portion 840 of the second window 800 may be in a space formed by the first side wall 740 and the second side wall 750.

According to various embodiments, the second window 800 may be disposed not to be covered by the housing decorations 743 and 753. The second window 800 may be replaced with another second window 800.

Figure 16C:
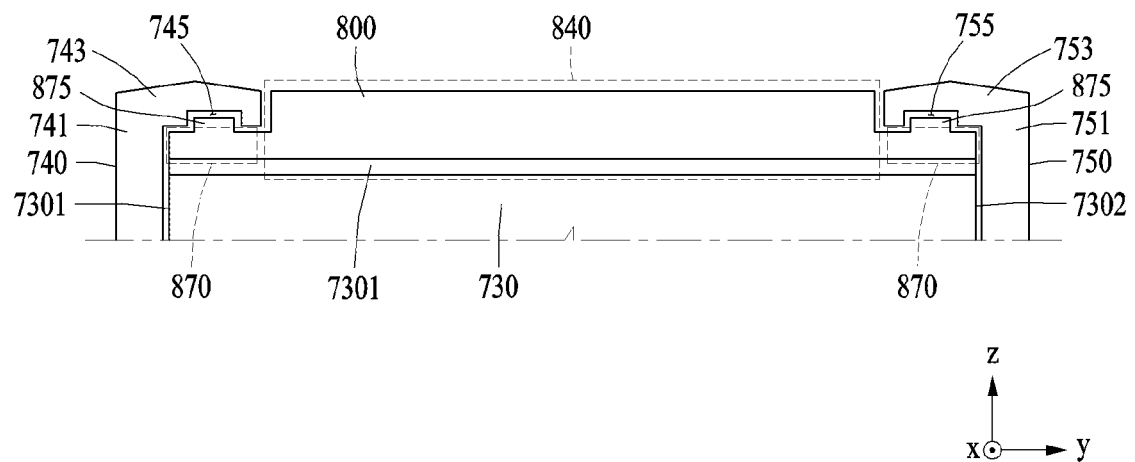
FIG. 16C illustrates another example of a cross section of an electronic device according to various example embodiments taken along the cut line of FIG. 16A.

FIG. 16C illustrates another example of a cross section of an electronic device according to various embodiments taken along the line III-III of FIG. 16A.

Referring to FIG. 16C, according to various embodiments, unlike the second window 800 illustrated in FIG. 16B, the second window 800 may be disposed so that the second window 800 may be shielded from the outside by the housing decorations 743 and 753.

According to another embodiment, the second window 800 may include a rolling portion 840 and a side portion 870. The side portion 870 may be an edge area of the second window 800 that extends in the y-axis direction from the rolling portion 840. At least a portion of the side portion 870 may be covered by the housing decorations 743 and 753. As shown in FIG. 16C, at least a partial area of the second window 800, for example, the side portion 870, may be shielded from the outside by the housing decorations 743 and 753, and the second window 800 may not be replaceable.

According to various embodiments, the side portion 870 may include a step formed due to a recess pattern formed in an edge area of the polymer layer 120. A height of the step formed in the side portion 870 may be greater than a height of the step formed in the rolling portion 840. A portion of the polymer layer 120 corresponding to the side portion 870 may be covered by the housing decorations 743 and 753. If a height of the polymer layer 120 is reduced by forming a relatively large number of steps compared to the polling portion 840, the total thickness may be reduced, and a step between the second window 800 and the housing decorations 743 and 753 may be reduced.

According to another embodiment, in the side portion 870 of the polymer layer 120 constituting the second window 800, a protrusion pattern that protrudes from a surface facing a direction opposite to a surface facing the first window 7301 to be insertable into a receiving groove (e.g., a receiving groove 745, 755) may be formed. The protrusion pattern may include the protrusion 875. The protrusion 875 may protrude from a surface (e.g., a z-axis direction) facing a direction opposite to a surface facing the display 730 in the side portion 870.

According to another embodiment, the first housing decoration 743 may include a first receiving groove 745 formed by recessing at least a portion of the surface facing the display 730 inward. The second housing decoration 753 may include a second receiving groove 755 formed by recessing at least a portion of the surface facing the display 730 inward. The protrusion 875 may be inserted into the receiving groove 745, 755. The receiving groove 745, 755 formed in the housing decoration 743, 753 and the protrusion 875 inserted into the receiving groove 745, 755 in the second window 800 may be formed in a rail structure, thereby preventing or reducing a phenomenon in which the display 730 is separated.

Figure 17:
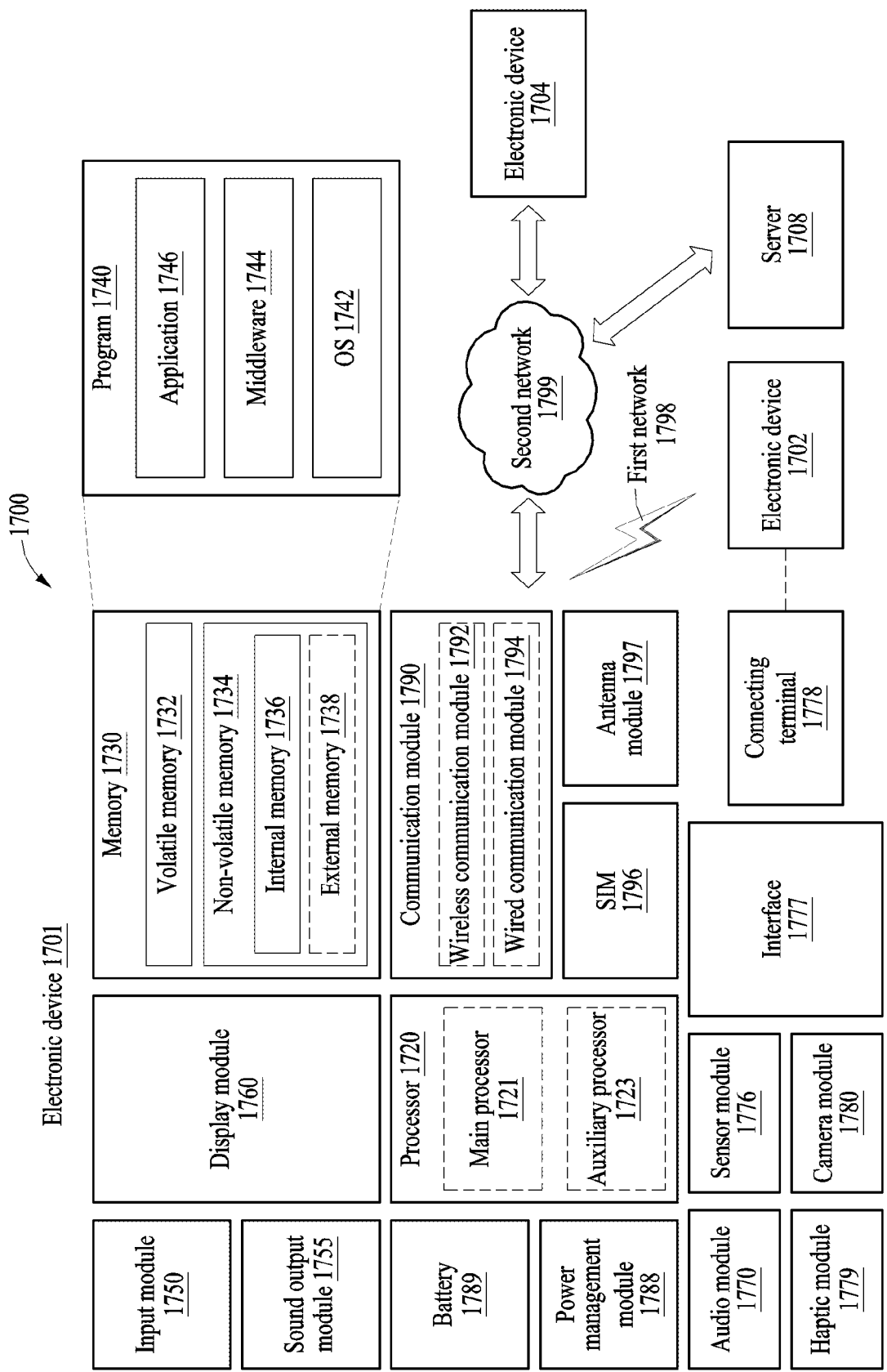
FIG. 17 is a block diagram illustrating an electronic device in a network environment according to various example embodiments.

FIG. 17 is a block diagram illustrating an electronic device 1701 in a network environment 1700. Referring to FIG. 17, the electronic device 1701 in the network environment 1700 may communicate with an electronic device 1702 via a first network 1798 (e.g., a short-range wireless communication network), or communicate with at least one of an electronic device 1704 or a server 1708 via a second network 1799 (e.g., a long-range wireless communication network). According to an embodiment, the electronic device 1701 may communicate with the electronic device 1704 via the server 1708. According to an embodiment, the electronic device 1701 may include a processor 1720, a memory 1730, an input module 1750, a sound output module 1755, a display module 1760, an audio module 1770, a sensor module 1776, an interface 1777, a connecting terminal 1778, a haptic module 1779, a camera module 1780, a power management module 1788, a battery 1789, a communication module 1790, a subscriber identification module (SIM) 1796, or an antenna module 1797. In some embodiments, at least one of the components (e.g., the connecting terminal 1778) may be omitted from the electronic device 1701, or one or more other components may be added to the electronic device 1701. In some embodiments, some of the components (e.g., the sensor module 1776, the camera module 1780, or the antenna module 1797) may be integrated as a single component (e.g., the display module 1760).

The processor 1720 may execute, for example, software (e.g., a program 1740) to control at least one other component (e.g., a hardware or software component) of the electronic device 1701 connected, directly or indirectly, to the processor 1720, and may perform various data processing or computation. According to an embodiment, as at least a part of data processing or computation, the processor 1720 may store a command or data received from another component (e.g., the sensor module 1776 or the communication module 1790 comprising communication circuitry) in a volatile memory 1732, process the command or the data stored in the volatile memory 1732, and store resulting data in a non-volatile memory 1734. According to an embodiment, the processor 1720 may include the main processor 1721 (e.g., a CPU or an AP), or an auxiliary processor 1723 (e.g., a GPU, a neural processing unit (NPU), an ISP, a sensor hub processor, or a CP) that is operable independently from, or in conjunction with the main processor 1721. For example, when the electronic device 1701 includes the main processor 1721 and the auxiliary processor 1723, the auxiliary processor 1723 may be adapted to consume less power than the main processor 1721 or to be specific to a specified function. The auxiliary processor 1723 may be implemented separately from the main processor 1721 or as a part of the main processor 1721.

The auxiliary processor 1723 may control at least some of functions or states related to at least one (e.g., the display module 1760, the sensor module 1776, or the communication module 1790) of the components of the electronic device 1701, instead of the main processor 1721 while the main processor 1721 is in an inactive (e.g., sleep) state or along with the main processor 1721 while the main processor 1721 is in an active state (e.g., executing an application). According to an embodiment, the auxiliary processor 1723 (e.g., an ISP or a CP) may be implemented as a portion of another component (e.g., the camera module 1780 or the communication module 1790) that is functionally related to the auxiliary processor 1723. According to an embodiment, the auxiliary processor 1723 (e.g., an NPU) may include a hardware structure specified for processing of an artificial intelligence model. The artificial intelligence model may be generated by machine learning. Such learning may be performed by, for example, the electronic device 1701 in which an artificial intelligence model is executed, or performed via a separate server (e.g., the server 1708). A learning algorithm may include, but is not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The artificial intelligence model may additionally or alternatively include a software structure other than the hardware structure.

The memory 1730 may store various pieces of data used by at least one component (e.g., the processor 1720 or the sensor module 1776) of the electronic device 1701. The various pieces of data may include, for example, software (e.g., the program 1740) and input data or output data for a command related thereto. The memory 1730 may include the volatile memory 1732 or the non-volatile memory 1734.

The program 1740 may be stored as software in the memory 1730, and may include, for example, an operating system (OS) 1742, middleware 1744, or an application 1746.

The input module 1750 may receive a command or data to be used by another component (e.g., the processor 1720) of the electronic device 1701, from the outside (e.g., a user) of the electronic device 1701. The input module 1750 may include, for example, a microphone, a mouse, a keyboard, a key (e.g., a button), or a digital pen (e.g., a stylus pen).

The sound output module 1755 may output a sound signal to the outside of the electronic device 1701. The sound output module 1755 may include, for example, a speaker or receiver. The speaker may be used for general purposes, such as playing multimedia or playing record. The receiver may be used to receive an incoming call. According to an embodiment, the receiver may be implemented separately from the speaker or as a portion of the speaker.

The display module 1760 may visually provide information to the outside (e.g., a user) of the electronic device 1701. The display module 1760 may include, for example, a control circuit for controlling a display, a hologram device, or a projector and control circuitry to control a corresponding one of the display, the hologram device, and the projector. According to an embodiment, the display module 1760 may include a touch sensor adapted to sense a touch, or a pressure sensor adapted to measure an intensity of a force incurred by the touch.

The audio module 1770 may convert a sound into an electric signal and vice versa. According to an embodiment, the audio module 1770 may obtain the sound via the input module 1750 or output the sound via the sound output module 1755 or an external electronic device (e.g., the electronic device 1702 such as a speaker or a headphone) directly or wirelessly connected to the electronic device 1701.

The sensor module 1776 may detect an operational state (e.g., power or temperature) of the electronic device 1701 or an environmental state (e.g., a state of a user) external to the electronic device 1701, and generate an electrical signal or data value corresponding to the detected state. According to an embodiment, the sensor module 1776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1777 may support one or more specified protocols to be used for the electronic device 1701 to be coupled with the external electronic device (e.g., the electronic device 1702) directly or wirelessly. According to an embodiment, the interface 1777 may include, for example, an HDMI, a USB interface, an SD card interface, or an audio interface.

The connecting terminal 1778 may include a connector via which the electronic device 1701 may be physically connected to an external electronic device (e.g., the electronic device 1702). According to an embodiment, the connecting terminal 1778 may include, for example, an HDMI connector, a USB connector, an SD card connector, or an audio connector (e.g., a headphone connector).

The haptic module 1779 may convert an electrical signal into a mechanical stimulus (e.g., a vibration or a movement) or an electrical stimulus which may be recognized by a user via his or her tactile sensation or kinesthetic sensation. According to an embodiment, the haptic module 1779 may include, for example, a motor, a piezoelectric element, or an electric stimulator.

The camera module 1780 may capture a still image and moving images. According to an embodiment, the camera module 1780 may include one or more lenses, image sensors, ISPs, or flashes.

The power management module 1788 may manage power supplied to the electronic device 1701. According to an embodiment, the power management module 1788 may be implemented as, for example, at least a part of a power management integrated circuit (PMIC).

The battery 1789 may supply power to at least one component of the electronic device 1701. According to an embodiment, the battery 1789 may include, for example, a primary cell which is not rechargeable, a secondary cell which is rechargeable, or a fuel cell.

The communication module 1790, comprising communication circuitry, may support establishing a direct (e.g., wired) communication channel or a wireless communication channel between the electronic device 1701 and the external electronic device (e.g., the electronic device 1702, the electronic device 1704, or the server 1708) and performing communication via the established communication channel. The communication module 1790 may include one or more communication processors that operate independently of the processor 1720 (e.g., an application processor) and support direct (e.g., wired) communication or wireless communication. According to an embodiment, the communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module, or a power line communication (PLC) module). A corresponding one of these communication modules may communicate with the external electronic device 1704 via the first network 1798 (e.g., a short-range communication network, such as Bluetooth™, wireless-fidelity (Wi-Fi) direct, or infrared data association (IrDA)) or the second network 1799 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 1792 may identify and authenticate the electronic device 1701 in a communication network, such as the first network 1798 or the second network 1799, using subscriber information (e.g., international mobile subscriber identity (IMSI)) stored in the SIM 1796.

The wireless communication module 1792 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1792 may support a high-frequency band (e.g., a mmWave band) to achieve, e.g., a high data transmission rate. The wireless communication module 1792 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 1792 may support various requirements specified in the electronic device 1701, an external electronic device (e.g., the electronic device 1704), or a network system (e.g., the second network 1799). According to an embodiment, the wireless communication module 1792 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1797 may transmit or receive a signal or power to or from the outside (e.g., an external electronic device) of the electronic device 1701. According to an embodiment, the antenna module 1797 may include an antenna including a radiating element including a conductive material or a conductive pattern formed in or on a substrate (e.g., a PCB). According to an embodiment, the antenna module 1797 may include a plurality of antennas (e.g., array antennas). In such a case, at least one antenna appropriate for a communication scheme used in a communication network, such as the first network 1798 or the second network 1799, may be selected by, for example, the communication module 1790 from the plurality of antennas. The signal or power may be transmitted or received between the communication module 1790 and the external electronic device via the at least one selected antenna. According to an embodiment, another component (e.g., a radio frequency integrated circuit (RFIC)) other than the radiating element may be additionally formed as a part of the antenna module 1797.

According to various embodiments, the antenna module 1797 may form a mmWave antenna module. According to an embodiment, the mmWave antenna module may include a PCB, an RFIC disposed on, directly or indirectly, a first surface (e.g., a bottom surface) of the PCB or adjacent to the first surface and capable of supporting a designated high-frequency band (e.g., a mmWave band), and a plurality of antennas (e.g., array antennas) disposed on, directly or indirectly, a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1701 and the external electronic device 1704 via the server 1708 coupled with the second network 1799. Each of the external electronic devices 1702 or 1704 may be a device of the same type as or a different type from the electronic device 1701. According to an embodiment, all or some of operations to be executed by the electronic device 1701 may be executed at one or more external electronic devices (e.g., the external electronic devices 1702 and 1704, and the server 1708). For example, if the electronic device 1701 needs to perform a function or a service automatically, or in response to a request from a user or another device, the electronic device 1701, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 1701. The electronic device 1701 may provide the outcome, with or without further processing of the outcome, as at least part of a reply to the request. To that end, a cloud computing, distributed computing, mobile edge computing (MEC), or client-server computing technology may be used, for example. The electronic device 1701 may provide ultra low-latency services using, e.g., distributed computing or MEC. In an example, the external electronic device 1704 may include an Internet-of-things (IoT) device. The server 1708 may be an intelligent server using machine learning and/or a neural network. According to an embodiment, the external electronic device 1704 or the server 1708 may be included in the second network 1799. The electronic device 1701 may be applied to intelligent services (e.g., a smart home, a smart city, a smart car, or healthcare) based on 5G communication technology or IoT-related technology.

According to various embodiments, an electronic device (e.g., the electronic device 300 of FIG. 4) may include a flexible display (e.g., the display 330 of FIG. 7) including a first window (e.g., the first window 3301 of FIG. 7); and a polymer layer (e.g., the polymer layer 120 of FIG. 7) disposed on the first window to overlap at least a partial area of the first window and having a pattern formed on at least a partial area of a surface facing a direction opposite to a surface facing the first window. Each of the first window, the flexible display, and the polymer layer may include a deformation portion (e.g., the folding area 330c and the folding portion 440 of FIG. 7) corresponding to a deformation axis (e.g., the folding axis A of FIG. 7), and a planar portion (e.g., the first area 330a, the second area 330b, and the planar portion 450 of FIG. 7) disposed on, directly or indirectly, at least one side based on the deformation portion, and the pattern may include a recess pattern formed in a lengthwise direction of the deformation axis in the deformation portion of the polymer layer.

According to various embodiments, the polymer layer may be hardened by at least one of ultraviolet (UV) light and heat.

According to various embodiments, the pattern may be formed by UV molding.

The polymer layer may be disposed on, directly or indirectly, a film layer (e.g., the film layer 110 of FIG. 7) to form a second window (e.g., the second window 400 of FIG. 7), and the second window may be attached to at least a portion of the first window by an adhesive (e.g., the adhesive 190 of FIG. 3A).

According to various embodiments, the pattern may include an uneven pattern formed on at least a portion of the planar portion of the polymer layer.

According to various embodiments, the uneven pattern may be excluded from a partial area of the planar portion of the polymer layer corresponding to an area (e.g., the sensor area 330d of FIG. 7) of the electronic device in which a sensor is disposed.

According to various embodiments, the pattern may include an uneven pattern formed on at least a portion of the deformation portion of the polymer layer.

According to various embodiments, a surface of the first window facing the polymer layer may be flat across the planar portion and the deformation portion of the first window.

According to various embodiments, a surface of the polymer layer facing the first window may be flat across the planar portion and the deformation portion of the polymer layer.

According to various embodiments, a surface of the first window facing the polymer layer may include a recess corresponding to the recess pattern, and the recess may be filled with a transparent polymer (e.g., the polymer 213 of FIG. 3B).

According to various embodiments, the first adhesive may have an adhesive strength less than that of a second adhesive (e.g., the adhesive 220 of FIG. 3A) used to attach the first window to a display panel (e.g., the display panel 230 of FIG. 3A) included in the flexible display, or a thickness of a portion to which the first adhesive is applied may be less than a thickness of a portion to which the second adhesive is applied.

According to various embodiments, the electronic device may include a housing decoration (e.g., the housing decorations 3131 and 3231 of FIG. 8A) configured to cover at least a portion of an edge area of the flexible display; and a sealing member (e.g., the sealing members 3135 and 3235 of FIG. 8A) attached to a portion of the housing decoration that covers at least a portion of the edge area to prevent or reduce foreign substances from flowing into a space between the housing decoration and the edge area.

According to various embodiments, the polymer layer may further include a side portion (e.g., the side portion 470 of FIG. 8B) that extends from the planar portion of the polymer layer, that is at least partially covered by the housing decoration and in which a step is formed.

According to various embodiments, a height of a step formed in the side portion of the polymer layer may be greater than a height of a step formed in the deformation portion of the polymer layer.

According to various embodiments, an electronic device (e.g., the electronic device 500 of FIG. 9) may include a first structure (e.g., the first structure 501 of FIG. 9); a second structure (e.g., the second structure 502 of FIG. 9) disposed to be movable in the first structure; a flexible display (e.g., the display 503 of FIG. 12) including a window (e.g., the first window 5031 of FIG. 12); a polymer layer (e.g., the polymer layer 120 of FIG. 12) disposed on, directly or indirectly, the first window to overlap at least a partial area of the window and having a pattern formed in at least a partial area of a surface facing a direction opposite to a surface facing the first window; and a housing decoration (e.g., the housing decorations 5232 and 5236 of FIG. 13B) configured to cover at least a portion of the window and including a receiving groove (e.g., the receiving grooves 5233 and 5237 of FIG. 13B) formed by recessing a surface facing the flexible display inward. Each of the window, the flexible display, and the polymer layer may include a planar portion (e.g., the first area A1 and the planar portion 650 of FIG. 12), a deformation portion (e.g., the second area A2 and the sliding portion 640 of FIG. 12) that is partially received inside the second structure according to a sliding movement of the first structure, and a side portion (e.g., the side portion 670 of FIG. 13B) that extends in a direction perpendicular to a sliding direction from the planar portion and the deformation portion, and the pattern may include a recess pattern that is formed in the sliding direction in the deformation portion of the polymer layer, and a protrusion pattern (e.g., the protrusion 675 of FIG. 13B) that protrudes from a surface facing a direction opposite to a surface facing the window to be inserted into the receiving groove in the side portion of the polymer layer.

According to various embodiments, the polymer layer may be hardened by at least one of ultraviolet (UV) light and heat.

According to various embodiments, the pattern may be formed by UV molding.

According to various embodiments, the pattern may include an uneven pattern formed on at least a portion of the planar portion of the polymer layer.

According to various embodiments, the uneven pattern may be excluded from a partial area of the planar portion of the polymer layer corresponding to an area (e.g., the sensor area 330d of FIG. 7) of the electronic device in which a sensor is disposed.

According to various embodiments, the pattern may include an uneven pattern formed on at least a portion of the deformation portion of the polymer layer.

The electronic device according to the embodiments disclosed herein may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be understood that various example embodiments and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "$1^{st}$", "$2^{nd}$", or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., by wire), wirelessly, or via a third element(s).

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC). Thus, each 'module' herein may comprise circuitry.

Various embodiments as set forth herein may be implemented as software (e.g., the program 1740) including one or more instructions that are stored in a storage medium (e.g., the internal memory 1736 or the external memory 1738) that is readable by a machine (e.g., the electronic device 1701) For example, a processor (e.g., the processor 1720) of the machine (e.g., the electronic device 1701) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
   a flexible display panel;
   a first window over the flexible display panel; and
   a polymer based layer, comprising a polymer, disposed over the first window to overlap at least a partial area of the first window and comprising a pattern formed on at least a partial area of a surface facing a direction opposite to a surface facing the first window,
   wherein each of the first window, the flexible display panel, and the polymer based layer comprises a deformation portion corresponding to a deformation axis and a planar portion disposed on at least one side based on the deformation portion, and
   wherein the pattern comprises a recess pattern formed in a lengthwise direction of the deformation axis on the partial area of the surface facing the direction opposite to the surface facing the first window.

2. The electronic device of claim 1, wherein the polymer based layer is hardened and/or cured by at least one of ultraviolet (UV) light and heat.

3. The electronic device of claim 1, wherein the pattern is formed by UV molding.

4. The electronic device of claim 1, wherein the pattern comprises an uneven pattern formed on at least a portion of the planar portion of the polymer based layer.

5. An electronic device comprising:
   a flexible display panel;
   a first window over the flexible display panel; and
   a polymer based layer, comprising a polymer, disposed on the first window to overlap at least a partial area of the first window and comprising a pattern formed on at least a partial area of a surface facing a direction opposite to a surface facing the first window,
   wherein each of the first window, the flexible display panel, and the polymer based layer comprises a deformation portion corresponding to a deformation axis and a planar portion disposed on at least one side based on the deformation portion,
   wherein the pattern comprises a recess pattern formed in a lengthwise direction of the deformation axis in the deformation portion of the polymer based layer,
   wherein the pattern comprises an uneven pattern formed on at least a portion of the planar portion of the polymer based layer, and wherein the uneven pattern is excluded from a partial area of the planar portion of the polymer based layer corresponding to an area of the electronic device in which a sensor is disposed.

6. The electronic device of claim 1, wherein the pattern comprises an uneven pattern formed on at least a portion of the deformation portion of the polymer based layer.

7. The electronic device of claim 1, wherein a surface of the first window facing the polymer based layer is flat across the planar portion and the deformation portion of the first window.

8. The electronic device of claim 1, wherein a surface of the polymer based layer facing the first window is flat across the planar portion and the deformation portion of the polymer based layer.

9. The electronic device of claim 1, wherein a surface of the first window facing the polymer based layer comprises a recess corresponding to the recess pattern, and the recess is at least partially filled with a transparent polymer.

10. An electronic device comprising:
    a first structure comprising a slide;
    a second structure comprising at least part of a housing, the first and/or second structure configured to be movable relative to the other;
    a flexible display comprising a window;
    a polymer based layer disposed on the window to overlap at least a partial area of the window and comprising a pattern formed on at least a partial area of a surface facing a direction opposite to a surface facing the window; and
    a housing decoration configured to cover at least a portion of the window, the housing decoration comprising a receiving groove formed by recessing a surface facing the window inward,
    wherein each of the window, the flexible display, and the polymer based layer comprises a planar portion, a deformation portion that is partially received inside the second structure based on sliding movement of the first structure, and a side portion that extends in a direction perpendicular to a sliding direction from the planar portion and the deformation portion, and
    wherein the pattern comprises a recess pattern that is formed in the sliding direction in the deformation portion of the polymer based layer, and a protrusion pattern that protrudes from a surface facing a direction opposite to a surface facing the window to be inserted into the receiving groove in the side portion of the polymer based layer.

11. The electronic device of claim 10, wherein the polymer based layer is hardened and/or cured by at least one of ultraviolet (UV) light and heat.

12. The electronic device of claim 10, wherein the pattern is formed by UV molding.

13. The electronic device of claim 10, wherein the pattern comprises an uneven pattern formed on at least a portion of the planar portion of the polymer based layer.

14. The electronic device of claim 10, wherein the pattern comprises an uneven pattern formed on at least a portion of the deformation portion of the polymer based layer.

* * * * *